United States Patent
Wilson et al.

(10) Patent No.: US 10,297,082 B2
(45) Date of Patent: May 21, 2019

(54) DRIVING A PROJECTOR TO GENERATE A SHARED SPATIAL AUGMENTED REALITY EXPERIENCE

(71) Applicant: Microsoft Technology Licensing, LLC, Redmond, WA (US)

(72) Inventors: Andrew D. Wilson, Seattle, WA (US); Hrvoje Benko, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/682,546

(22) Filed: Apr. 9, 2015

(65) Prior Publication Data

US 2016/0098862 A1 Apr. 7, 2016

Related U.S. Application Data

(60) Provisional application No. 62/060,901, filed on Oct. 7, 2014.

(51) Int. Cl.
| | |
|---|---|
| *G06T 19/00* | (2011.01) |
| *G06T 3/00* | (2006.01) |
| *G06F 3/01* | (2006.01) |
| *G06F 3/16* | (2006.01) |
| *H04N 9/31* | (2006.01) |

(52) U.S. Cl.
CPC ............ *G06T 19/006* (2013.01); *G06F 3/011* (2013.01); *G06F 3/013* (2013.01); *G06F 3/017* (2013.01); *G06F 3/167* (2013.01); *G06T 19/00* (2013.01); *H04N 9/3185* (2013.01); *G06T 2219/024* (2013.01)

(58) Field of Classification Search
CPC .................................................... G06T 19/006
USPC ......................................................... 345/419
See application file for complete search history.

(56) References Cited

U.S. PATENT DOCUMENTS

| | | | |
|---|---|---|---|
| 6,803,928 B2 | 10/2004 | Bimber et al. | |
| 2005/0069223 A1* | 3/2005 | Tanimura | G06K 9/00362 382/284 |
| 2011/0316845 A1 | 12/2011 | Roberts et al. | |
| 2012/0113223 A1 | 5/2012 | Hilliges et al. | |

(Continued)

FOREIGN PATENT DOCUMENTS

| | | |
|---|---|---|
| EP | 2624217 A1 | 8/2013 |
| WO | 2014032089 A1 | 3/2014 |

OTHER PUBLICATIONS

Adrian S Johnson and Yu Sun, Exploration of Spatial Augmented Reality on Person, IEEE, IEEE Virtual Reality Mar. 16-20, 2013, Orlando, FL, USA, 978-1-4673-4796-9/13 © 2013 IEEE, p. 59-60.*

(Continued)

*Primary Examiner* — Hai Tao Sun
(74) *Attorney, Agent, or Firm* — Medley, Behrens, & Lewis, LLC

(57) ABSTRACT

Various technologies pertaining to shared spatial augmented reality (SSAR) are described. Sensor units in a room output sensor signals that are indicative of positions of two or more users in the room and gaze directions of the two or more users. Views of at least one virtual object are computed separately for each of the two or more users, and projectors project such views in the room. The projected views cause the two or more users to simultaneously perceive the virtual object in space.

20 Claims, 11 Drawing Sheets

(56) References Cited

U.S. PATENT DOCUMENTS

| | | | |
|---|---|---|---|
| 2012/0120103 A1* | 5/2012 | Border | G02B 27/017 345/633 |
| 2012/0188148 A1* | 7/2012 | DeJong | G02B 27/0093 345/8 |
| 2013/0093788 A1* | 4/2013 | Liu | G06F 3/011 345/633 |
| 2013/0107021 A1 | 5/2013 | Maizels et al. | |
| 2013/0120365 A1 | 5/2013 | Lee et al. | |
| 2013/0215149 A1* | 8/2013 | Hayashi | G06T 19/00 345/633 |
| 2013/0222369 A1* | 8/2013 | Huston | G06T 17/00 345/419 |
| 2013/0326364 A1* | 12/2013 | Latta | G06F 3/012 715/751 |
| 2014/0253692 A1 | 9/2014 | Wilson et al. | |
| 2015/0262426 A1* | 9/2015 | Marner | G06F 3/011 345/419 |

OTHER PUBLICATIONS

Billinghurst, et al., "Mixing Realities in Shared Space: An Augmented Reality Interface for Collaborative Computing", In IEEE International Conference on Multimedia and Expo, Jul. 30, 2000, pp. 1641-1644.

Argelaguet, et al., "Improving Co-located Collaboration with Show-Through Techniques", In IEEE Symposium on 3D User Interfaces, Mar. 20, 2010, pp. 55-62.

Johnson, et al., "Exploration of Spatial Augmented Reality on Person", In IEEE Virtual Reality, Mar. 16, 2012, pp. 59-60.

Ismail, et al., "Multi-user Interaction in Collaborative Augmented Reality for Urban Simulation", In Proceedings of Second International Conference on Machine Vision, Dec. 28, 2009, pp. 309-314.

Raskar, et al., "Table-Top Spatially-Augmented Reality: Bringing Physical Models to Life with Projected Imagery", In Proceedings of Second IEEE and ACM International Workshop on Augmented Reality, Oct. 20, 1999, pp. 1-8.

Bimber, et al., "Spatial Augmented Reality", In Proceedings of 33rd International Conference and Exhibition on Computer Graphics and Interactive Techniques, Jul. 30, 2006, pp. 1-471.

Nakamura, et al., "Calibration-Free Projector-Camera System for Spatial Augmented Reality on Planar Surfaces", In Proceedings of 21st International Conference on Pattern Recognition, Nov. 11, 2012, pp. 85-88.

Dolce, Andrews, "Multi-User Interactions for Spatially Augmented Reality Games", In Thesis of Master of Science, Apr. 2011, 64 pages.

Arthur, et al., "Evaluating 3D Task Performance for Fish Tank Virtual Worlds", In Journal ACM Transactions on Information Systems, vol. 11, Issue 3, Jul. 1993, pp. 239-265.

Agrawala, et al., "The Two-User Responsive Workbench: Support for Collaboration through Individual Views of a Shared Space", In Proceedings of the 24th Annual Conference on Computer Graphics and Interactive Techniques, Aug. 3, 1997, pp. 1-6.

Benko, et al., "MirageTable: Freehand Interaction on a Projected Augmented Reality Tabletop", In Proceedings of the SIGCHI Conference on Human Factors in Computing Systems, May 5, 2012, pp. 199-208.

Bimber, et al., "The Virtual Showcase", In IEEE Computer Graphics and Applications, vol. 21, Issue 6, Nov. 2001, pp. 48-55.

Broecker, et al., "Depth Perception in View-Dependent Near-Field Spatial AR", In Proceedings of the Fifteenth Australasian User Interface Conference, Jan. 20, 2014, pp. 87-88.

Cakmakci, et al., "Head-Worn Displays: A Review", In Journal of Display Technology, vol. 2, Issue 3, Sep. 2006, pp. 199-216.

Neira, et al., "Surround-Screen Projection-based Virtual Reality: The Design and Implementation of the CAVE", In Proceedings of the 20th Annual Conference on Computer Graphics and Interactive Techniques, Sep. 1993, pp. 135-142.

Cutting, et al., "Perceiving Layout and Knowing Distances: The Integration, Relative Potency, and Contextual use of Different Information about Depth", In Proceedings of Handbook of Perception and Cognition, vol. 5, Oct. 17, 2014, pp. 69-117.

Gilinsky, Alberta S., "Perceived Size and Distance in Visual Space", In Proceedings of Psychological Review, vol. 58, Oct. 17, 2014, pp. 460-482.

Hancock, et al., "The Effects of Changing Projection Geometry on the Interpretation of 3D Orientation on Tabletops", In Proceedings of the ACM International Conference on Interactive Tabletops and Surfaces, Nov. 23, 2009, pp. 157-164.

Harrison, et al., "OmniTouch: Wearable Multitouch Interaction Everywhere", In Proceedings of the 24th annual ACM Symposium on User Interface Software and Technology, Oct. 16, 2011, pp. 441-450.

Heo, et al., "Transwall: A Transparent Double-Sided Touch Display Facilitating co-Located Face-to-Face Interactions", In Proceedings of Extended Abstracts on Human Factors in Computing Systems, Apr. 26, 2014, pp. 435-438.

Hirakawa, et al., "A Collaborative Augmented Reality System using Transparent Display", In IEEE Sixth International Symposium on Multimedia Software Engineering, Dec. 13, 2004, pp. 410-416.

Hou, et al., "Effects of Screen Size, Viewing Angle, and Players' Immersion Tendencies on Game Experience", In Journal of Computers in Human Behavior, vol. 28, Issue 2, Mar. 2012, pp. 617-623.

Ishii, et al., "ClearBoard: A Seamless Medium for Shared Drawing and Conversation with Eye Contact", In Proceedings of the SIGCHI Conference on Human Factors in Computing Systems, May 3, 1992, pp. 525-532.

Jones, et al., "IllumiRoom: Peripheral Projected Illusions for Interactive Experiences", In Proceedings of 40th International Conference and Exhibition on Computer Graphics and Interactive Techniques, Jul. 21, 2013, p. 1.

Jones, et al., "RoomAlive: Magical Experiences Enabled by Scalable, Adaptive Projector-Camera Units", In Proceedings of the 27th Annual ACM Symposium on User Interface Software and Technology, Oct. 5, 2014, pp. 637-644.

Khoshelham, K., "Accuracy Analysis of Kinect Depth Data", In Proceedings of International Archives of the Photogrammetry, Remote Sensing and Spatial Information Sciences, Aug. 29, 2011, pp. 133-138.

Olwal, et al., "An Immaterial, Dual-sided Display System with 3D Interaction", In Proceedings of the IEEE conference on Virtual Reality, Mar. 25, 2006, pp. 285-286.

Pinhanez, Claudio, "The Everywhere Displays Projector: A Device to Create Ubiquitous Graphical Interfaces", In Proceedings of Ubiquitous Computing, Third International Conference Atlanta, Sep. 30, 2001, pp. 1-18.

Raskar, et al., "iLamps: Geometrically Aware and Self-Configuring Projectors", In Proceedings of 30th International Conference on Computer Graphics and Interactive Techniques, Jul. 27, 2003, pp. 809-818.

Raskar, et al., "The Office of the Future: a Unified Approach to Image-Based Modeling and Spatially Immersive Displays", In Proceedings of the 25th Annual Conference on Computer Graphics and Interactive Techniques, Jul. 19, 1998, pp. 1-10.

Raskar, et al., "Spatially Augmented Reality", In Proceedings of First International Workshop on Augmented Reality, Nov. 1998, pp. 1-7.

Raskar, et al., "Shader Lamps: Animating Real Objects with Image-Based Illumination", In Proceedings of the 12th Eurographics Workshop on Rendering Techniques, Jun. 25, 2001, pp. 1-10.

Rekimoto, et al., "Augmented Surfaces: A Spatially Continuous Work Space for Hybrid Computing Environments", In Proceedings of the SIGCHI Conference on Human Factors in Computing Systems, May 15, 1999, pp. 378-385.

Tang, et al., "Kinect-based Augmented Reality Projection with Perspective Correction", In Proceedings of International Conference and Exhibition on Computer Graphics and Interactive Techniques, Aug. 7, 2011, p. 1.

(56) References Cited

OTHER PUBLICATIONS

Underkoffler, et al., "Emancipated Pixels: real-World Graphics in the Luminous Room", In Proceedings of the 26th Annual Conference on Computer Graphics and Interactive Techniques, Jul. 1999, pp. 385-392.
Wilson, Andrew D., "Depth-Sensing Video Cameras for 3D Tangible Tabletop Interaction", In Proceedings of Second Annual IEEE International Workshop on Horizontal Interactive Human-Computer Systems, Oct. 10, 2007, pp. 1-4.
Benko, et al., "Combining Multiple Depth Cameras and Projectors for Interactions on, Above and Between Surfaces", In Proceedings of the 23nd Annual ACM Symposium on User Interface Software and Technology, Oct. 3, 2010, pp. 273-282.
Wilson, et al., "Steerable Augmented Reality with the Beamatron", In Proceedings of the 25th Annual ACM Symposium on User Interface Software and Technology, Oct. 7, 2012, pp. 1-10.
Wilson, et al., "Bringing Physics to the Surface", In Proceedings of the 21st Annual ACM Symposium on User Interface Software and Technology, Oct. 19, 2008, pp. 67-76.
"International Search Report and Written Opinion Issued in PCT Application No. PCT/US2015/054100", dated Dec. 7, 2015, 13 Pages.
"Response to the International Search Report and Written Opinion Issued in PCT Application No. PCT/US2015/054100", Filed Date: Mar. 21, 2016, 10 Pages.
"Written Opinion Issued in PCT Application No. PCT/US2015/054100", dated Aug. 30, 2016, 7 Pages.
"International Preliminary Report on Patentability Issued in PCT Application No. PCT/US2015/054100", dated Nov. 25, 2016, 8 Pages.
"Response to the Office Action for European Patent Application No. 15782187.7", Filed Date: Jul. 21, 2017, 10 Pages.

* cited by examiner

DRIVING A PROJECTOR TO GENERATE A SHARED SPATIAL AUGMENTED REALITY EXPERIENCE

RELATED APPLICATION

This application claims priority to U.S. Provisional Patent Application No. 62/060,901, filed on Oct. 7, 2014, and entitled "SHARED SPATIAL AUGMENTED REALITY", the entirety of which is incorporated herein by reference.

BACKGROUND

Spatial augmented reality (SAR) techniques create augmented reality experiences by changing the look of a physical environment with projected light. Whereas many augmented reality approaches involve rendering graphics over a live video feed on handheld or head worn devices, SAR places graphics directly over the physical object, thus not diverting attention of a user from the real world. "See through" head-worn displays can achieve similar effects; however, conventional head-worn displays support a limited field of view and are somewhat bulky, thereby potentially hindering face-to-face interaction between users.

Under the right circumstances, SAR systems can alter an appearance of a surface of an object to make such surface appear as if it is made of a particular material. For example, a SAR system can cause a carpeted floor to appear to a user as a mossy bog. To achieve this effect, a precise geometric model of the physical environment is required. The geometric model is used to alter projected graphics to account for distortion of the projected image caused by variations in real-world surface geometry. Use of SAR, however, is currently limited due to conventional SAR systems supporting augmenting graphics for a single view, and thus conventional SAR systems support a single user.

SUMMARY

The following is a brief summary of subject matter that is described in greater detail herein. This summary is not intended to be limiting as to the scope of the claims.

A computing system is described herein, where the computing system comprises at least one processor and memory that comprises a plurality of components that are executed by the at least one processor, the plurality of components include a tracker component that is configured to compute a first location of a first user and a second location of a second user in a room, the tracker component computes the first location and the second location based upon at least one signal generated by at least one sensor device. The components further include a render component that is configured to 1) compute a first view based upon the first location of the first user, the first view to be presented to the first user, the first view comprises a virtual object; and 2) compute a second view based upon the second location of the second user, the second view to be presented to the second user, the second view comprises the virtual object; and 3) transmit at least one frame to at least one projector that causes the at least one projector to project imagery onto projection surfaces in the room, the imagery includes at least one of: at least a portion of the first view; or at least a portion of the second view, such that both the first user and the second user perceive the virtual object in space between the first user and the second user.

DETAILED DESCRIPTION

Figure 1:
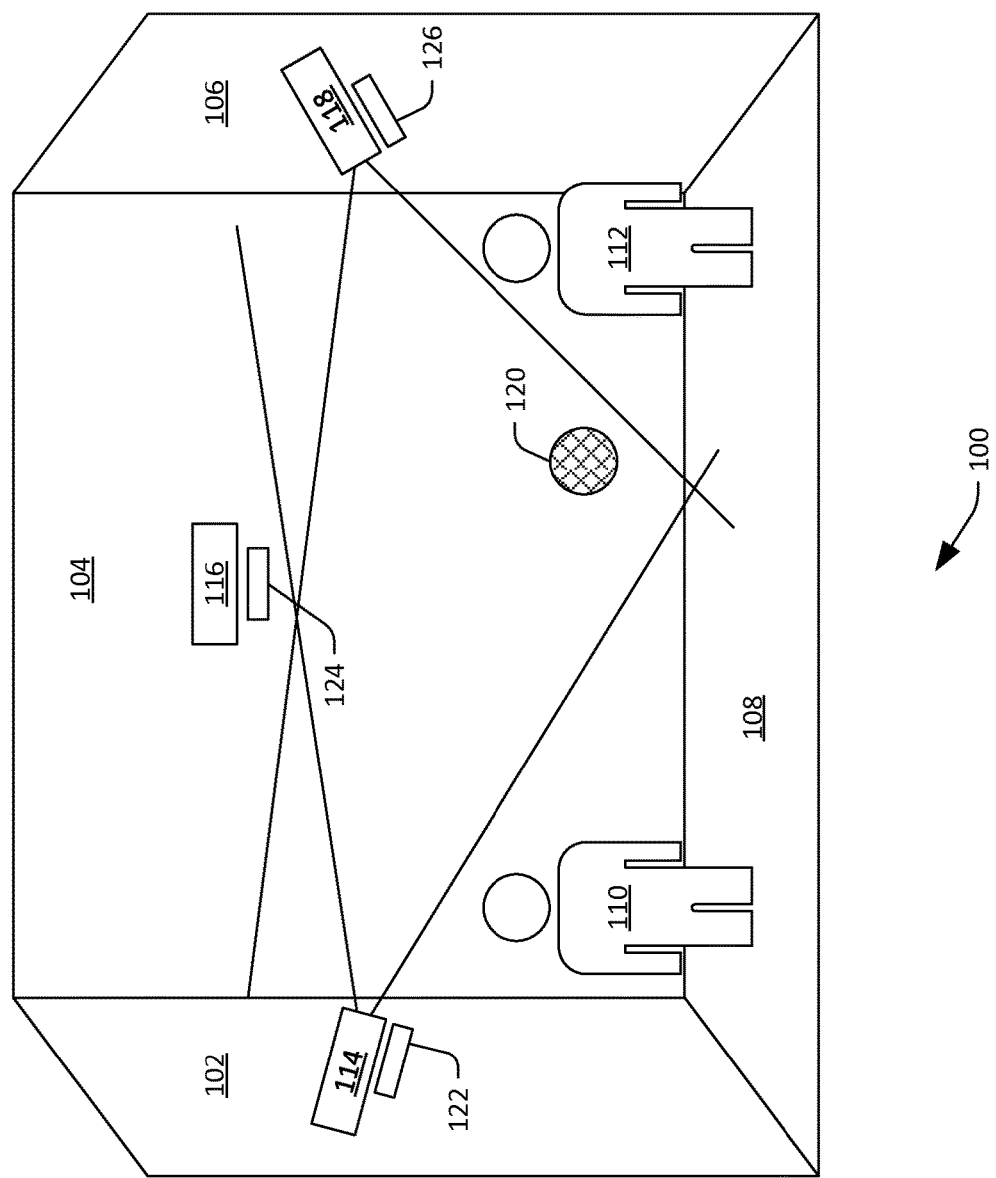
FIG. 1 illustrates an exemplary room that comprises equipment that is configured to effectuate shared spatial augment reality (SSAR).

Various technologies pertaining to shared spatial augment reality (SSAR) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Various technologies pertaining to SSAR are described herein, where imagery projected onto projection surfaces in a room causes two or more users in the room to simultaneously perceive a virtual object in space between the two users. That is, both users simultaneously perceive the virtual object as being in space between the two users (as if an actual object were in space between the two users). Furthermore, the technologies described herein can cause two users to simultaneously perceive movement of the virtual object in space, such that, for example, a first user can perceive that the virtual object is moving closer while the second user can perceive that the virtual object is moving further away. SSAR can be effectuated by causing at least one projector to project imagery onto projection surfaces of the room, where neither the first user nor the second user needs to wear augmented reality (AR) headgear.

With reference now to FIG. 1, a room 100 is illustrated, where the room is equipped with projectors and sensors. As will be described herein, the projectors are configured to project imagery onto projection surfaces of the room 100 based upon data output by the sensors, where the projected imagery effectuates SSAR for at least two users in the room 100. The room 100 is bounded by a first wall 102, a second wall 104 that is orthogonal to the first wall 102, a third wall 106 that parallel with the first wall 102, and a floor 108. While the first wall 102 is shown as being parallel to the third wall 106 and orthogonal to the second wall 104, the room 100 need not be square or rectangular. In an example, the walls 102-106 and the floor 108 act as projection surfaces. The room 100 also includes a ceiling and a fourth wall (not shown). Further, the room 100 can include furniture, electronics, rugs, carpet, and so forth, which can also act as projection surfaces.

A first user 110 and a second user 112 are in the room 100 and facing one another. For example, the first user 110 can be proximate to the first wall 102, while the second user 112 can be proximate to the third wall 106. The first user 110, then, when facing the second user 112, views the third wall 106 and portions of the second wall 104 and the floor 108 (in the periphery of the field of view of the first user 110). Likewise, the second user 112, when facing the first user 110, views the first user 110, the first wall 102 and portions of the second wall 104 and the floor 108 (in the periphery of the field of view of the second user 112).

The room 100 has a first projector 114, a second projector 116, and a third projector 118 therein. The first projector 114 is mounted on the first wall 102 above the head of the first user 110. The first projector 114 is configured to project imagery onto projection surfaces on the right-hand side of the room 100, such as the third wall 106, the second person 112, a rightward portion of the second wall 104, a rightward portion of the floor 108, etc. The third projector 118 is mounted to the third wall 106 above the head of the second user 112. The third projector 118 is configured to project imagery onto projection surfaces on the left-hand side of the room 100, such as the first wall 102, the leftward portion of the second wall 104, the first user 110, and the leftward portion of the floor 108. The second projector 116 is mounted on the second wall 104 and is configured to project imagery onto projection surfaces in the room 100 to "fill gaps" in imagery projected by the first projector 114 and the third projector 118. For example, there may be portions of the floor 108 where both the first projector 114 and the third projector 118 are unable to project imagery. The second projector 116 can be configured to project imagery onto such portion of the floor 108, as well as provide overlapping imagery in other portions of the room 100.

While three projectors are illustrated as being in the room 100, it is to be understood that more or fewer projectors may be included in the room. For example, as will be shown in an embodiment below, the room 100 may include a single projector (e.g., positioned in or attached to the ceiling) that is configured to simultaneously project imagery onto the first wall 102, the second wall 104, the third wall 106, and the floor 108. In another example, only the first projector 114 and the third projector 118 may be in the room 100. In yet another example, more than three projectors may be positioned in the room 100.

As will be described in greater detail below, the projectors 114-118 project imagery onto projection surfaces in the room 100 (including the walls and the users 110 and 112), such that SSAR is effectuated. More particularly, the imagery projected by the projectors 114-118 causes both the first user 110 and the second user 112 to simultaneously perceive at least one virtual object 120 in space between the first user 110 and the second user 112. The virtual object 120 can be a three-dimensional object, such as a ball, a globe, a building, etc. In another example, the virtual object 120 can be a planar object, such as a map.

To compute imagery that is projected by the projectors 102-106, a three-dimensional geometric model of the room 100 is to be generated and updated in real-time, and views of the users 110 and 112 are to be determined and updated in real-time. The view of each user is a function of position of each user in the room 100 (e.g., position of the head of each user) and gaze direction of each user. A plurality of sensor units 122-126 can be included in the room, where each of the sensor units 122-126 is configured to generate at least one signal, the at least one signal being indicative of depths of objects in a field of view of the sensor from the sensor, and further indicative of types of the objects. For example, each of the sensor units 122-126 can include a red-green-blue (RGB) camera and a depth sensor (camera) that are calibrated with one another, and the at least one signal output by each sensor can be a color video feed and a depth feed (video frames and depth frames).

With more particularity, the room 100 is illustrated as including a first sensor unit 122 that is positioned proximate to the first projector 114, a second sensor unit 124 that positioned proximate to the second projector 116, and a third sensor unit 126 unit that is positioned proximate to the third projector 118. As noted above, the sensor units 122-126 can include RGB cameras and/or depth cameras. The depth cameras can generate depth frames based upon any suitable depth-sensing technology, such as structured light technology, time of flight technology, etc. The signals generated by the sensor units 122-126, over time, are indicative of movement of the users 110 and 112 in the room 100. As will be described below, based upon the signals generated by the sensor units 122-126, imagery can be computed for each of the projectors 114-118 in real-time, and the projectors 114-118 can output the imagery, such that the users 110 and 112 are each provided with a spatially correct view of the virtual object 120, where the virtual object 120 is positioned in space as a function of detected movement of at least one of the users 110-112. For example, the virtual object 120 may be a three-dimensional globe, and the first user 110 can reach her hand towards the globe and set forth a gesture. The third sensor unit 126 can generate a signal that captures the gesture (e.g., color frames and depth frames), and the gesture can be detected based upon the signal. Responsive to the gesture being detected, imagery for projection by the projectors 114-118 is computed, where the imagery, when projected, causes the first user 110 and the second user 112 to perceive that the globe is spinning. In another example, the virtual object 120 may be a ball, and the second user 112 can make a gesture as if she was throwing the ball towards the first user 110. The first sensor unit 122 can generate a sensor signal that is indicative of such gesture, and the projectors 114-118 can be caused to project imagery onto projection surfaces in the room 100, wherein such projected imagery causes the first user 110 and the second user 112 to perceive that the ball is traveling in a direction from the second user 112 towards the first user 110. Put more simply, the first user 110 and the second user 112 can be provided with the perception that they are playing catch with one another, both perceiving a ball traveling between the first user 110 and the second user 112, even though the ball is virtual and the experience is caused by projected imagery.

Figure 2:
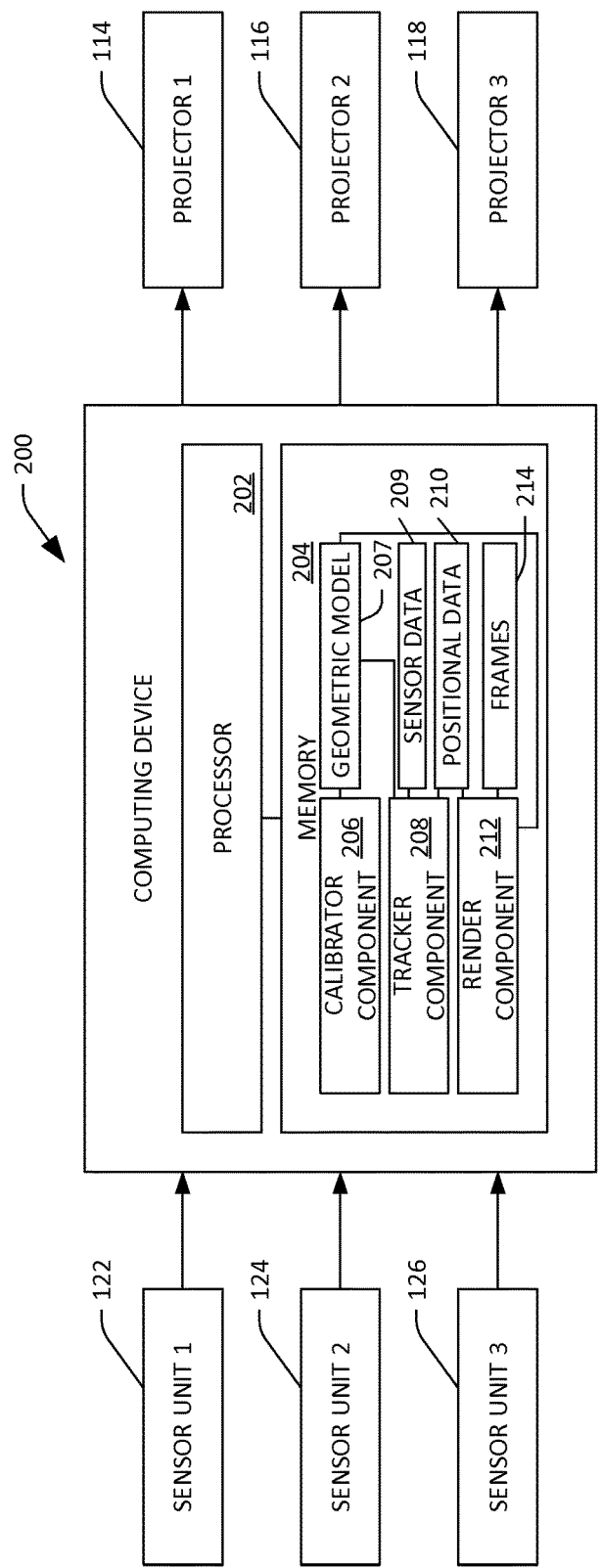
FIG. 2 is a functional block diagram of an exemplary system that is configured to cause projectors to project imagery that effectuates SSAR.

With reference now to FIG. 2, an exemplary computing device 200 that is configured to compute imagery that is to be projected by the projectors 114-118 based upon sensor signals generated by the sensor units 122-126 is illustrated. While the computing device 200 is shown as a single computing device, it is to be understood that the computing device 200 may be multiple computing devices that are in communication with one another and act synchronously with respect to one another. Further, the computing device 200 may be located proximate to the projectors 114-118 and the sensor units 122-126 in the room 100. In another example, the computing device 200 can be located at a data center, and can be in communication with the projectors 114-118 and the sensor units 122-126 by way of a suitable high-speed network connection. Further, the computing device 200 may be any suitable computing device that can process sensor signals generated by the sensor units 122-126 and compute imagery for projection by the projectors 114-118. Thus, the computing device 200 may be a server computing device, a desktop computing device, a laptop computing device, a tablet (slate) computing device, a mobile telephone, a wearable computing device, or the like.

The computing device 200 comprises a processor 202 and memory 204 that comprises data and instructions that are accessible to the processor 202. With more particularity, the memory 204 includes a plurality of components that are executed by the processor 202, wherein the components, when executed by the processor 202, perform certain functionality. The plurality of components comprises a calibrator component 206 that is configured to generate a three-dimensional geometric model 207 of the room 100 based upon signals output by the sensor units 122-126 positioned about the room. As indicated previously, the sensor units 122-126 can include RGB cameras as well as depth cameras. The calibrator component 206 can calibrate the sensor units 122-126 to determine a global coordinate system, and can generate the three-dimensional geometric model 207 of the room 100 in the global coordinate system.

In a non-limiting example, the calibrator component 206 can be configured to determine pose, focal length, and optical center of each projector and sensor unit. For instance, the calibrator component 206 can recover such information in an off-line procedure where each projector in turn displays a series of Gray code patterns, and RGB cameras of the sensor units 122-126 capture images of the Gray code patterns on projection surfaces of the room 100. The calibrator component 206 can identify the locations of the Gray code patterns in images output by the sensor units 122-126, and can determine a mapping from a three-dimensional point in a coordinate frame of the color camera of one or more of the sensor units 122-126 to the corresponding point in the projector's image.

In the example where the projectors and sensor units are co-located in pairs, the calibrator component 206 can determine the relative pose of each projector-sensor unit pair by driving all RBG cameras of the sensor units to observe the Gray code patterns of other projectors, noting regions where imagery output by other projectors overlaps with the projector for the RBG camera, and computing the transform that brings corresponding 3D points of overlapping regions into alignment. This process results in determination of the global coordinate system for all projectors and sensor units. Dynamic projection mapping also requires a precise surface geometry the room 100. As indicated above, each sensor unit can include a depth camera, where precision of depth data output by the depth camera can be approximately constant over the range of depth reported by the depth camera. Using the global coordinate system and depth data output by the depth cameras of the sensor units 122-126, the 3D geometric model 207 of the room 100 can be generated.

The memory 204 further includes a tracker component 208 that is configured to receive sensor data 209 output by the sensor units 122-126 and the 3d geometric model 207 of the room 100, and is further configured to compute positional data 210 based upon the sensor data 209 and the 3D geometric model 207 of the room 100. The positional data 210 can include positions of the first user 110 and the second user 112 in the room 100, estimated gaze directions in the room 100 of the first user 110 and the second user 112, and estimated fields of view of the users 110-112 (where the fields of view include identification of portion(s) of projection surface(s) of the room in the field of view of the users 110-112).

With respect to gaze direction, the tracker component 208, for example, can estimate the gaze direction for each user based upon 3D position of the head of each user in the room 100 and tilt of the head of each user in the room 100. Still further, the tracker component 208 can identify position of each eye of each user based upon the sensor data 209, and can estimate the gaze direction of each user based upon the position of each eye of the user. In addition, the tracker component 208 can perform skeletal tracking to compute movement of extremities of the users 110-112, including arm movements, hand movements, head movements, finger movements, and so forth.

The tracker component 208 can estimate the field of view of each of the users 110 and 112 based upon the estimated gaze directions of the users 110 and 112. With more particularity, based upon the 3D geometric model 207 of the room 100 and the gaze directions of the users 110 and 112, the tracker component 208 can identify portion(s) of projection surface(s) that will be seen by the users 110-112 given their current position in the room 100 and their current gaze direction.

The memory 204 also includes a render component 212 that generates, for the projectors 114-118 in the room 100, frames 214 that are to be projected by the projectors 114-118, wherein the frames 214 are based upon the virtual object 120 that is to be perceived by the users 110-112, position in space where the users 110-112 are to perceive the virtual object 120, the positional data 210 computed by the tracker component 208, and coverage of the projectors.

With more particularity, the render component 212 computes a first view for the first user 110 and a second view for the second user 112, where the first user 110 is to perceive the first view and the second user 112 is to perceive the second view. As noted above, the render component 212 computes the views based upon the positional data 210 output by the tracker component 208 and the 3D geometric model 207 of the room 100 (updated in real-time to reflect positions of the users 110 and 112 in the room 100). These computed views can be abstracted over the projectors 114-118. The first view for the first user 110 indicates where imagery is to be projected in the room 100 to cause the first user 110 to perceive that the virtual object 120 is at a particular position in space in the room 100, while the second view for the second user 112 indicates where imagery is to be projected in the room to cause the second user 112 to perceive that the virtual object 120 is at the particular position in space in the room 100. Based upon the known coverage of the projectors 114-118 determined during calibration and the computed views, the render component 212 can generate the frames 214 for the respective projectors 114-118 and transmit the frames 114-118 to the projectors 114-118. The projectors 114-118 project the respective frames 214 in response to receipt thereof, and the projected imagery causes the users 110-112 to both perceive the virtual object 120 in space in the room 100.

Further, since the first and second users 110 and 112 may themselves be projection surfaces, the render component 212 can compute the first view for the first user 110 based upon the position of the second user 112 in the room 100. Likewise, the render component 212 can compute the second view for the second user 112 based upon the location of the first user 110 in the room, wherein the locations of the users 110 and 112 in the room 100 are computed by the tracker component 208. As indicated previously, the tracker component 208 and the render component 212 can compute the positional data 210 and the frames 214, respectively, in real-time, such that imagery projected by the projectors 114-118 is updated as the user 110 and/or the user 112 changes location and/or gaze direction in the room 100.

Figure 3:
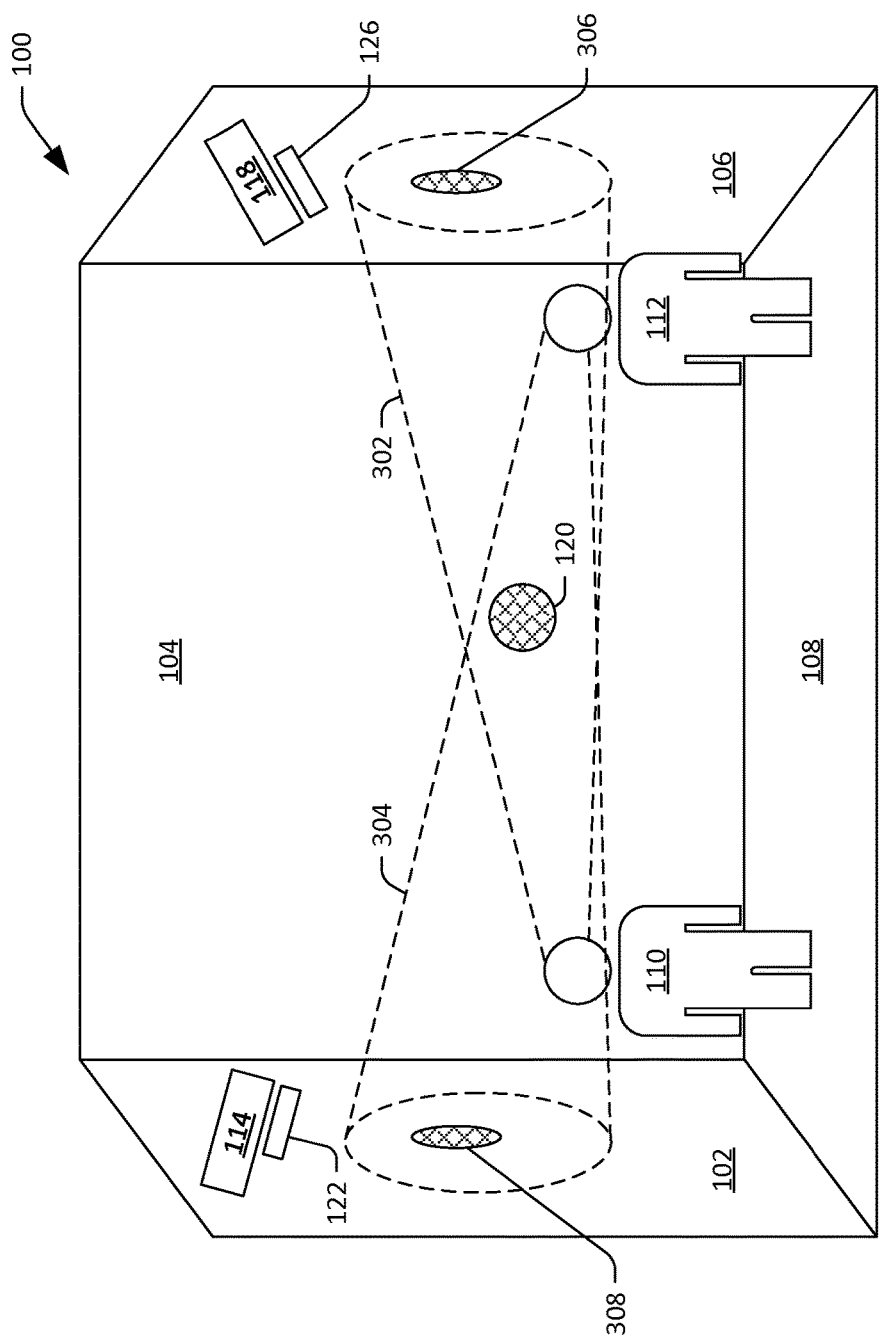
FIG. 3 illustrates a room where projectors project imagery onto projection surfaces therein, such that two users facing one another in the room perceive a virtual object in a space between such users.

Now referring to FIG. 3, another exemplary depiction of the room 100 is illustrated. In the room 100 as depicted in FIG. 3, the first projector 114, the first sensor unit 122, the third projector 118, and the third sensor unit 126 are included therein. The first projector 114 is configured to project imagery on the third wall 106 of the room, while the third projector 118 is configured to project imagery on the first wall 102 of the room 100.

Based upon a signal output by the third sensor unit 126 and the 3D geometric model 207 of the room 100, the tracker component 208 can compute a first field of view for the first user 110, as depicted by reference numeral 302. Similarly, based upon a sensor signal output by the first sensor unit 122 and the 3D geometric model 207 of the room 100, the tracker component 208 can compute a second field of view for the second user 112, as depicted by reference numeral 304.

The render component 212 computes a first view for the first user 110 and a second view for the second user 112 based upon the fields of view 302 and 304, respectively, and a position in space where the users 110 and 112 are to perceive the virtual object 120. For instance, the render component 212 can receive an indication that the virtual object 120 is to be perceived by the first user 110 and the second user 112 as being at a particular location in space between the first user 110 and the second user 112. The render component 212 then computes a view for each of the users 110 and 112 that cause the users 110 and 112 to simultaneously perceive the virtual object 120 as being at the position in space. Thus, the virtual object 120 is rendered twice: once for the first user 110 and once for the second user 112. Because the first user 110 and the second user 112 are looking in opposite directions, the first user 110 is unlikely to see graphics intended for the second user 112 and vice versa, because the imagery intended for the second user 112, for example, will appear behind the first user 110 on the first wall 102 (or on the body of the first user 110). As the render component 212 has knowledge of the desired spatial position in the room 100 where the first user 110 is to perceive the virtual object 120, the render component 212 can generate a frame that is to be projected by the first projector 114 that, when projected by the first projector 114 onto the third wall 106, includes a rendering of the virtual object 120 with an appropriate size and orientation to cause the first user 110 to perceive that the virtual object 120 is at the desired spatial position in the room 100.

Similarly, since the render component 212 is aware of the intended spatial position of the virtual object 120 in the room 100, the render component 212 can generate a frame that, when projected by the third projector 118 on the first wall 102, includes a rendering of the virtual object 120 with an appropriate size and orientation to cause the second user 112 to perceive that the virtual object 120 is at the desired spatial position in the room 100. As shown in FIG. 3, the first projector 114 can project a first rendering 306 of the virtual object 120 on the third wall 106 at an appropriate position and orientation on the third wall 106 that causes the first user 110 to perceive the virtual object 120 at the intended spatial location. Likewise, and simultaneously, the third projector 118 projects a second rendering 308 of the virtual object 120 on the first wall 102 that causes the second user 112 to perceive the virtual object 120 at the intended spatial location (e.g., between the first user 110 and the second user 112).

Figure 4:
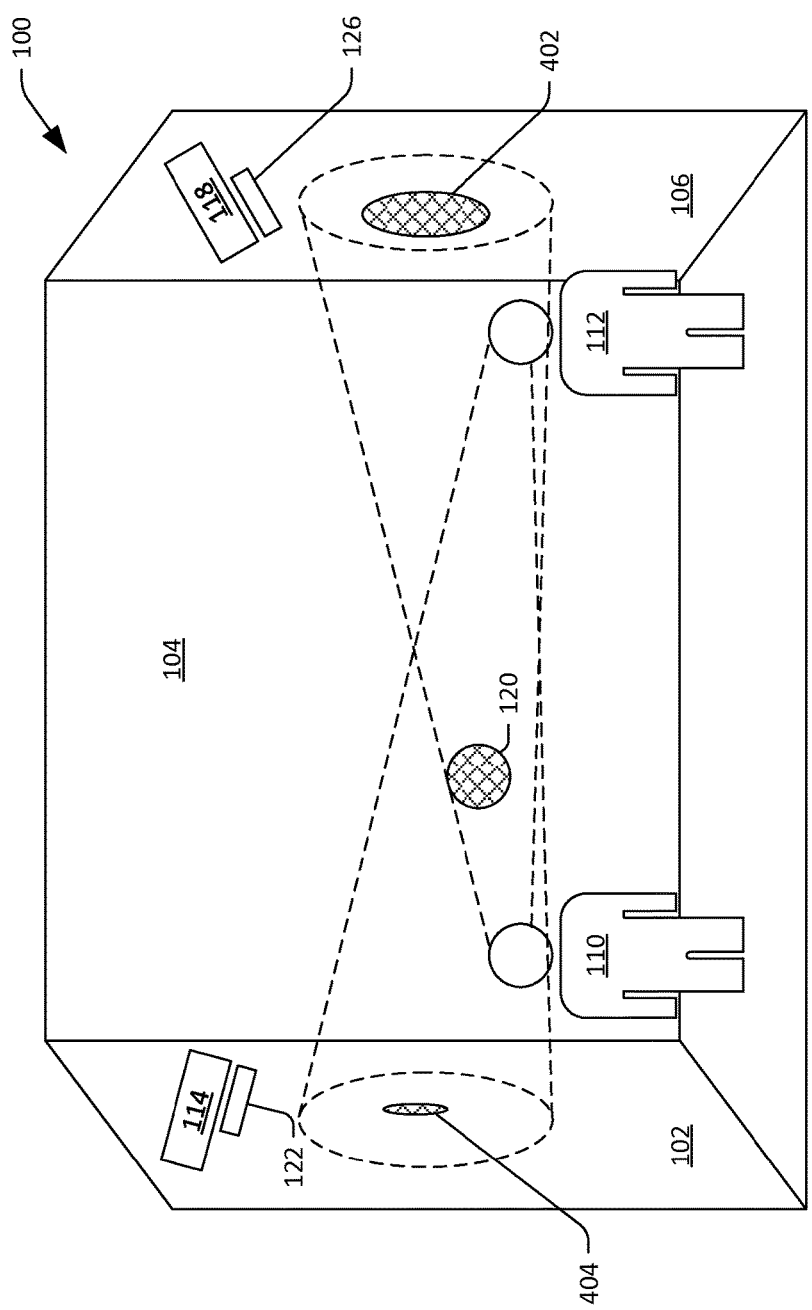
FIG. 4 illustrates a room where projectors project imagery onto projection surfaces therein, such that two users facing one another perceive a virtual object moving in space between such users.

With reference now to FIG. 4, another exemplary depiction of the room 100 is illustrated. In FIG. 3, the virtual object 120 is illustrated as being at a position in space that is approximately equivalent in distance from both the first user 110 and the second user 112. In FIG. 4, the virtual object 120 is illustrated as being in space closer to the first user 110 than the second user 112. As described previously, based upon signals output by the first sensor unit 122 and the third sensor unit 126, the tracker component 208 can compute the positional data 210, which includes positions of the first user 110 and the second user 112 in the room 100 and fields of view of the users 110 and 112.

The render component 212, based upon the fields of view of the users 110 and 112, and further based upon the virtual object 120 and spatial location in the room 100 where the virtual object 120 is to be perceived by the users 110 and 112, can compute a first view for the first user 110 and a second view for the second user 112. Since the virtual object 120 is to appear to the first user 110 to be in close proximity to the first user, the first view computed by the render component 212 can include a first rendering 402 of the virtual object 120 to be projected onto the third wall 106. The first rendering 402 of the virtual object 120 is relatively large on the third wall 106, providing the first user 110 with the perception that the virtual object 120 is relatively close to the first user 110. In contrast, the second view computed by the render component 212 for the second user 112 can include a second rendering 404 of the virtual object 120 that is projected onto the first wall 102, where the second rendering 404 of the virtual object 120 is relatively small, thus providing the second user 112 with the perception that the virtual object 120 is positioned in space a relatively large distance away from the second user 112. As noted previously, the tracker component 208 and the render component 212 can operate in real-time, such that views computed for the first user 110 and the second user 112 are computed in real time, and the renderings of the virtual object 120 are updated as the position of the virtual object 120 changes, as the location of the first user 110 changes and/or as the location of the second user 112 changes, as gaze direction of either the first user 110 or the second user 112 changes, etc.

Figure 5:
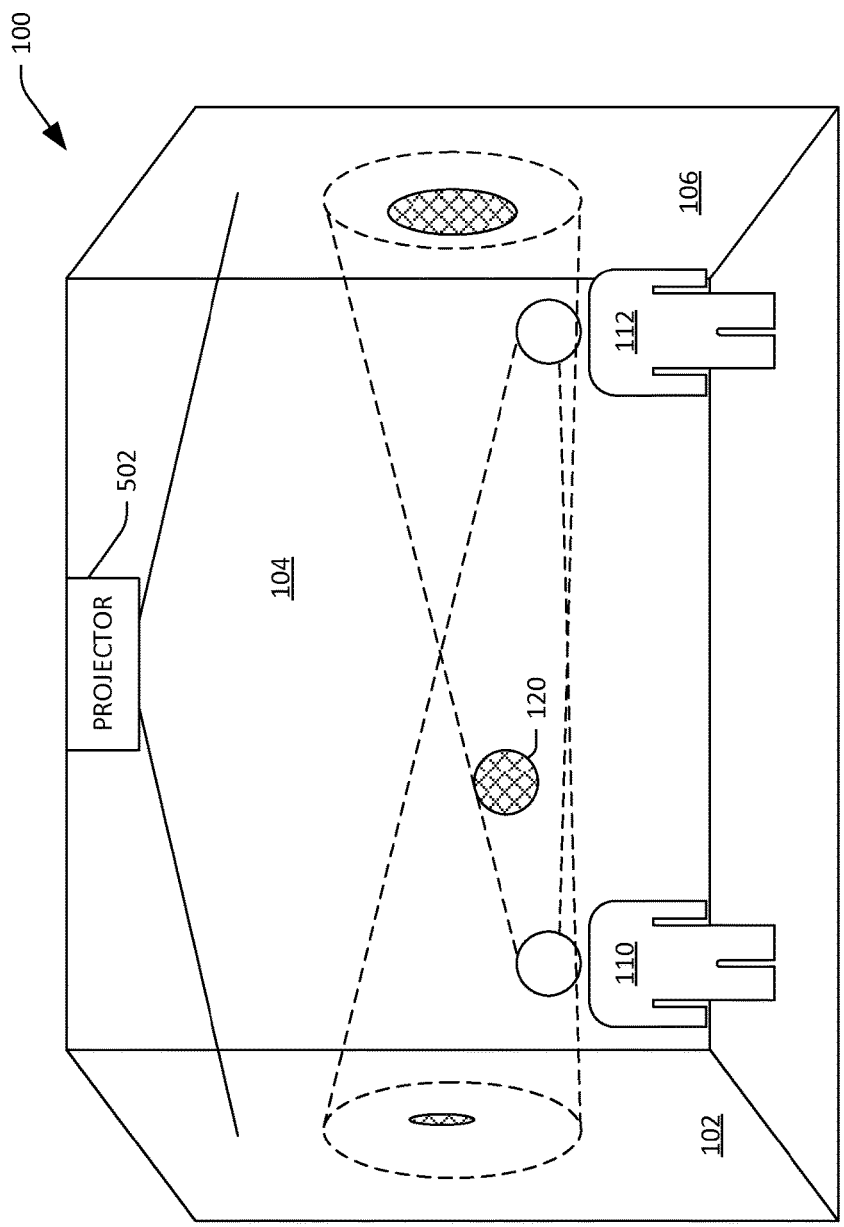
FIG. 5 illustrates an exemplary room with an overhead projector that projects imagery on projection surfaces of the room, such that two users facing one another perceive a virtual object in space between the two users.

FIG. 5 is another depiction of the room 100. In this example, a single projector 502 is included in the room, and the projector 502 is attached to the ceiling of the room 100 or embedded in the ceiling of the room 100. The projector 502 can be a wide-angle projector, such that the projector 502 can project imagery onto at least the first wall 102 and the third wall 106 simultaneously. The render component 212, as described above, computes a first view for the first user 110 and a second view for the second user 112; however, the projector 502 projects both views. That is, the frames 214 generated by the render component 212 represent both the first view and the second view.

Figure 6:
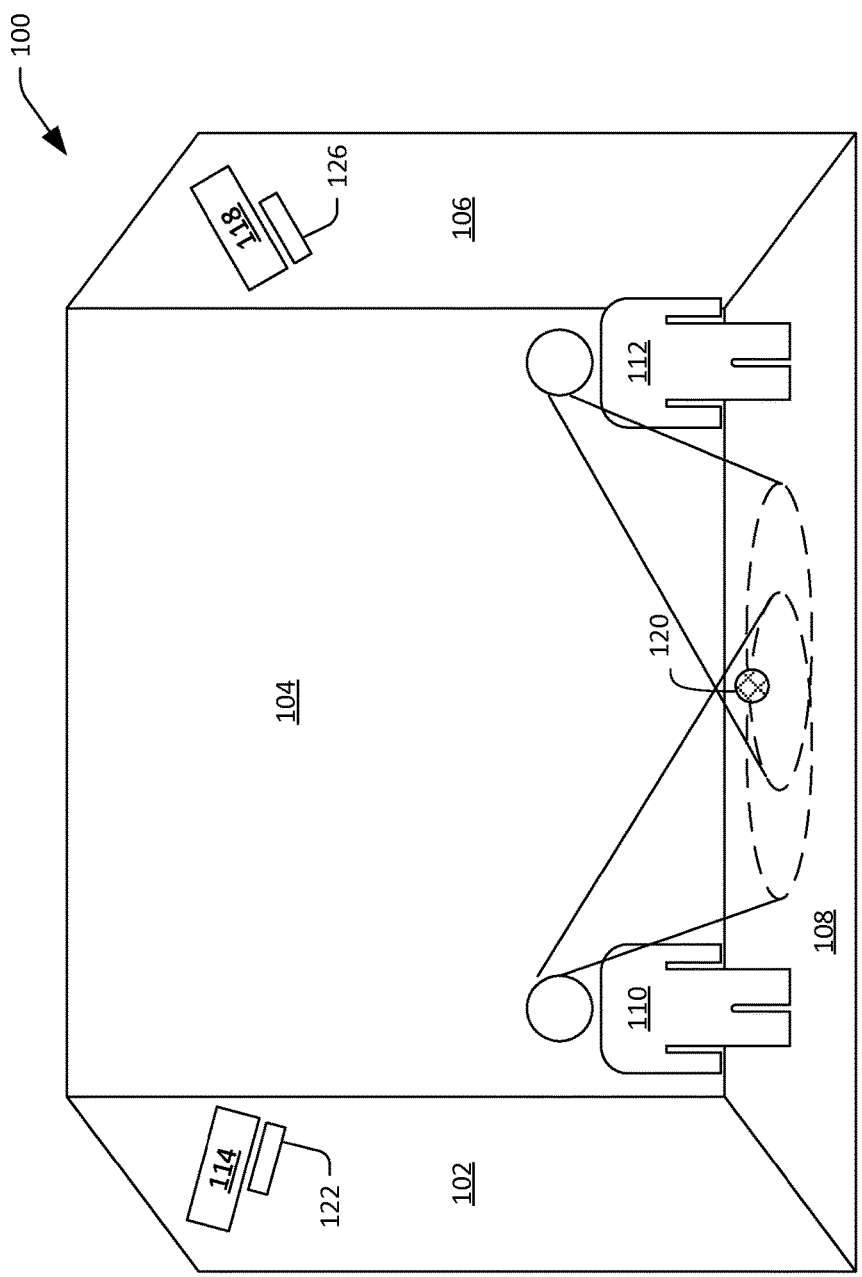
FIG. 6 illustrates an exemplary room where projectors project imagery onto a projection surface based upon two users simultaneously viewing the projection surface.

Now referring to FIG. 6, another exemplary depiction of the room 100 is provided. In this depiction, the first and second views computed by the render component for the first user 110 and the second user 112, respectively, overlap on a projection surface. In other words, the first user 110 will perceive the rendering of the virtual object 120 intended for the second user 112 (as well as the rendering of the virtual object 120 intended for the first user 110), and the second user 112 will perceive the rendering of the virtual object 120 intended for the first user 110 (as well as the rendering of the virtual object intended for the second user 112).

When the render component 212 detects this situation, the render component 212 can perform any of a variety of techniques. In a first example, the render component 212 can blend the views for the users 110 and 112, such that the first view for the first user 110 and the second view for the second user 112 are simultaneously projected in the room 100. In other words, both users 110 and 112 may perceive two views of the virtual object 120 on the floor 108. When the virtual object 120 is to be perceived as being on the ground, the two views for the two users 110 and 112 will overlap. In another example, the render component 212 can render a single view that is to be perceived by both users 110 and 112 (e.g., where the rendering of the virtual object 120 is placed in between the two renderings of the virtual object 120 that would otherwise be presented to the users 110 and 112. In yet another example, one of the two users 110 or 112 may be the dominant user, such that when the render component detects that the views overlap, the render component 212 generates frames based upon the dominant view, such that the rendering of the virtual object 120 is shown so that the dominant user perceives the virtual object 120 as being in the appropriate position in space.

Figure 7:
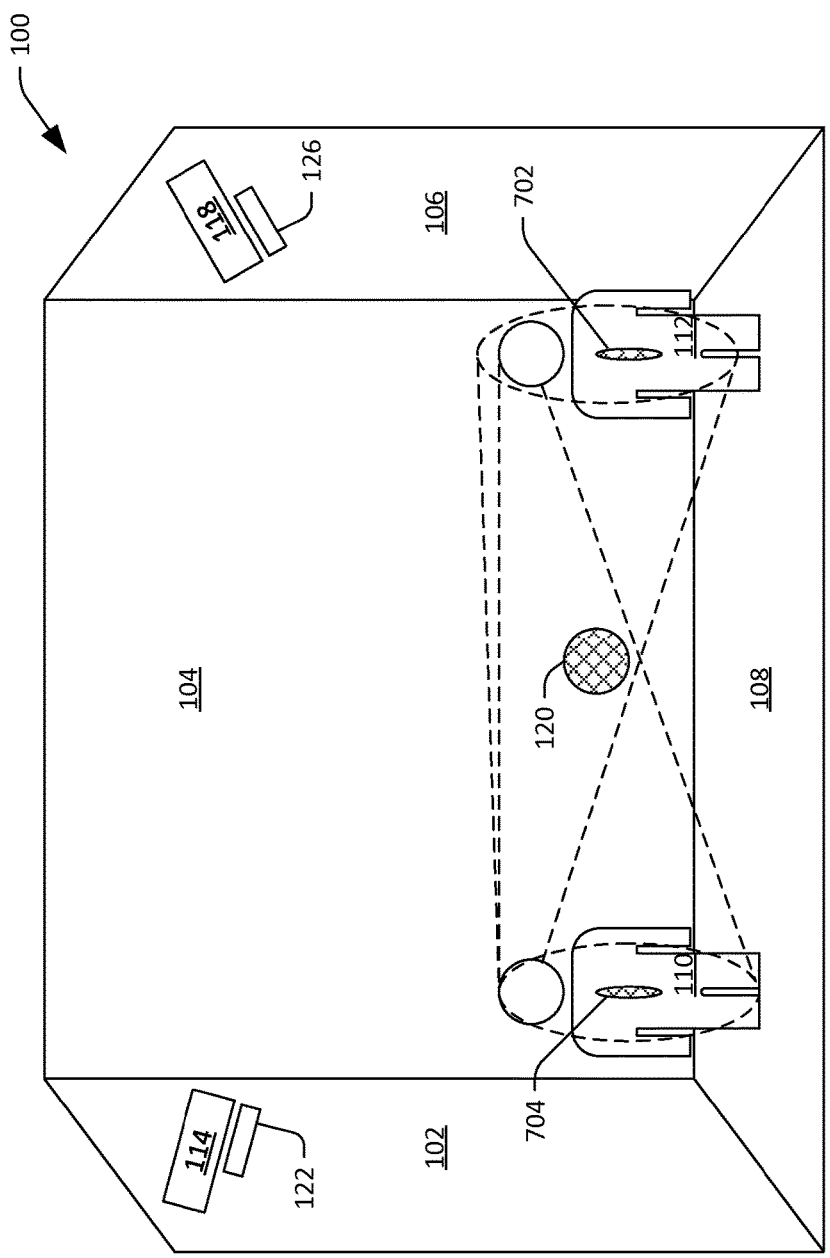
FIG. 7 illustrates an exemplary room where projectors project imagery on mobile users who are facing one another, such that the users act as projection surfaces.

Now referring to FIG. 7, another exemplary depiction of the room 100 is provided. In this example, the users 110 and 112 themselves act as projection surfaces. That is, the render component 212 computes the views for the users based upon the positions of the users 110 and 112 in the room and the shapes of the users 110 and 112. In the example shown here, the render component 212 computes the first view for the first user 110 such that a first rendering 702 of the virtual object 120 is at least partially projected onto the second user 112. The render component 212 simultaneously computes the second view for the second user 112 such that a second rendering 704 of the virtual object 120 is at least partially projected onto the first user 110.

In addition to taking into consideration the positional data 210 when computing the views, the render component 212 can take into consideration textures, patterns, and/or reflective natures of projection surfaces in the room 100. For example, the first user 110 may be wearing a reflective, light-colored shirt while wearing less reflective, dark-colored pants. The render component 212 can ascertain such information based upon images output by the third sensor unit 126 in the room 100. The render component 212 may then compute views and construct frames 214, such that the third projector 118 projects imagery onto the first user 110, the imagery accounts for the different textures, reflectiveness, patterns, etc. Further, the render component 212 can compute views and construct the frames 214 based upon color properties of projection surfaces in the room, such as, but not limited to, color hues, textures, etc.

While FIGS. 1 and 3-7 illustrate exemplary arrangements of projectors and sensors in a room, it is to be understood that other arrangements and extensions are contemplated. For example, rather than the projectors and sensor units being affixed to walls in the room, the projectors and/or sensor units can be implemented in headgear that is to be worn by the users 110-112. The projectors can have inertial sensors associated therewith, such that fields of view of users 110-112 in the room 100 can be determined based upon detected positions of the projectors in the headgear. The render component 212 can generate the views for the users 110-112 based upon detected positions of the projectors. In another example, the render component 212 can compute two views for each user: one for each eye of each user. In such a case, the room 100 can include stereoscopically arranged projectors, where a first projector projects a view for one eye and a second projector projects a view for the other eye. In such a case, each of the users can wear shutter glasses.

Additionally, from the foregoing, it can be ascertained that numerous SSAR applications are contemplated, where the users 110 and 112 can interact with one or more virtual objects in space between the users 110 and 112. For example, touching a virtual object can be implemented by intersecting either tracked hand position or points taken from a depth map for the user with the geometry of the virtual object 120.

In another example, the render component 212 can cause the projectors 114-118 to project imagery such that the users 110 or 112 perceive that one of such users is holding the virtual object 120 in her hand. In yet another example, the virtual object 120 may be scripted to follow a point adjusted above the hand as the hand is tracked in three dimensions by one or more of the sensors 122-126. The render component 212, as described above, generates two renderings of the virtual object 120: one for each user. As, for example, the first user 110 holds her hand up in front of her body, her view will include a large projection at the far surface of the room 100 possibly spanning the body of the second user 112. Meanwhile, the view of the second user 112 will include a small projection of the object possibly over the torso of the first user 110.

In still yet another example, held objects can be dropped or thrown by meeting some conditions for release. For example, a held ball may be thrown if the velocity or acceleration of the hand exceeds some threshold. At the moment of release, the ball may take the velocity of the throwing hand. Catching or picking up may be implemented by simply testing when an object is sufficiently close to a tracked hand.

In other examples, collision of virtual objects with surfaces in a room or user can be detected, leading to a realistic collision response. Precomputed collision geometries for static parts of the room can be used and shape of moving objects can be approximated. While with a rendering pipeline it is relatively straightforward to apply texture to a static part of the room, applying a texture to a moving object, such as a user, requires real-time tracking of a projection surface. Low-level motion features, such as optical flow, can be used for this real-tie tracking. Real-time optical flow can be computed from infrared (IR) video from (IR) sensors. A texture can be applied to moving objects by determining an initial placement of the texture then following the surface over many frames using the motion estimated by optical flow.

As indicated previously, the virtual object 120 may be any suitable virtual object, such as a three-dimensional model, a ball or the like. Further, the render component 212 can render multiple virtual objects at a same time, such that the users 110 and 112 both perceive the multiple virtual objects in space between the users 110 and 112. In yet another example, text can be rendered in space between the two users 110 and 112. For instance, the first user 110 and the second user 112 may speak different languages. The aspects described herein can allow for detection of speech of either of the users 110 and 112, and display of a speech bubble in between the first user 110 and the second user 112, wherein each of the users will see the speech in the language that they respectively understand and in the appropriate orientation.

There are also numerous applications in gaming, healthcare, etc., where the features described herein may be particularly well-suited. For example, features described herein can allow for a doctor to observe reflexes of a patient to an incoming object without requiring the doctor to actually use the object. Thus, the doctor can observe if the user can catch a ball without actually having to throw the ball to the user. The features described herein may also be well-suited for physical therapy applications where two patients can have a SSAR experience without requiring use of physical objects. For instance, the two patients may play a game of catch without requiring use of the ball, may play a game of virtual tennis, as the system described herein can render tennis rackets and balls that are perceived correctly from both users, etc. Other applications will be readily contemplated.

FIGS. 8-11 illustrate exemplary methodologies relating to SSAR. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 8:
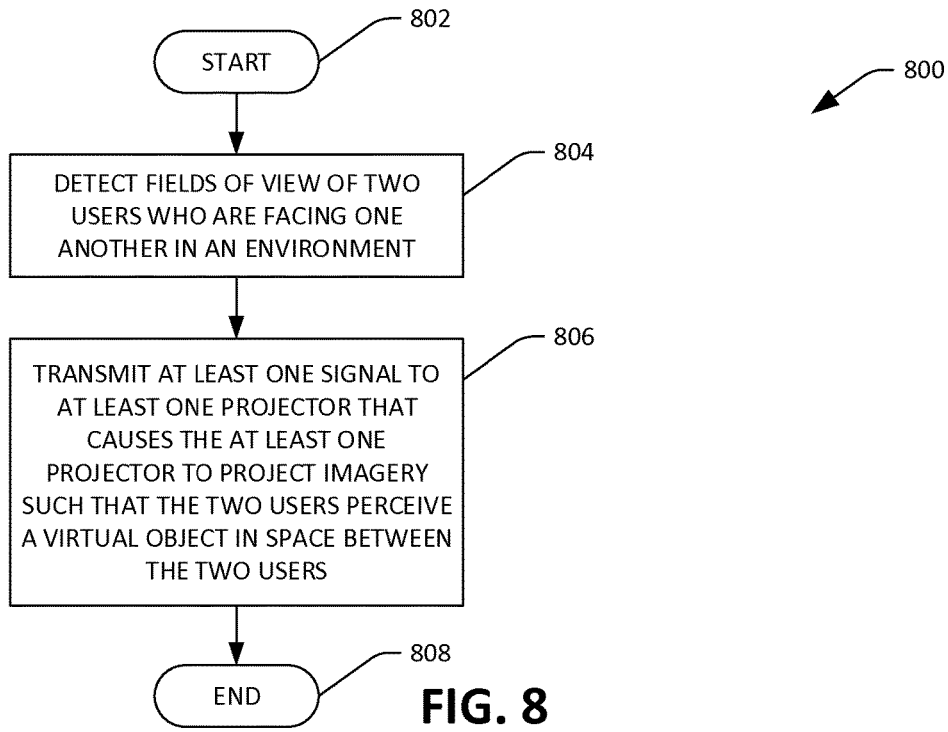
FIG. 8 is a flow diagram that illustrates an exemplary methodology for projecting imagery onto projection surfaces in a room, such that two users perceive a virtual object in a space between the two users.

Now referring to FIG. 8, an exemplary methodology 800 for effectuating SSAR is illustrated. The methodology 800 starts at 802, and at 804, fields of view of two users who are facing one another in an environment (a room) are detected. As indicated previously, the fields of view can be detected based upon sensor signals that are indicative of location of the two users in the environment, head tilt of the users in the environment, and the like. At 806, at least one signal is transmitted to at least one projector that causes the at least one projector to project imagery onto projection surfaces, wherein the imagery, when projected onto the projection surfaces, causes the two users to perceive a virtual object in space between the two users. While the methodology 800 is shown as ending at 808, it is to be understood that the methodology 800 can repeat, such that the imagery is updated in real-time as field of view and/or spatial location of the virtual object changes.

Figure 9:
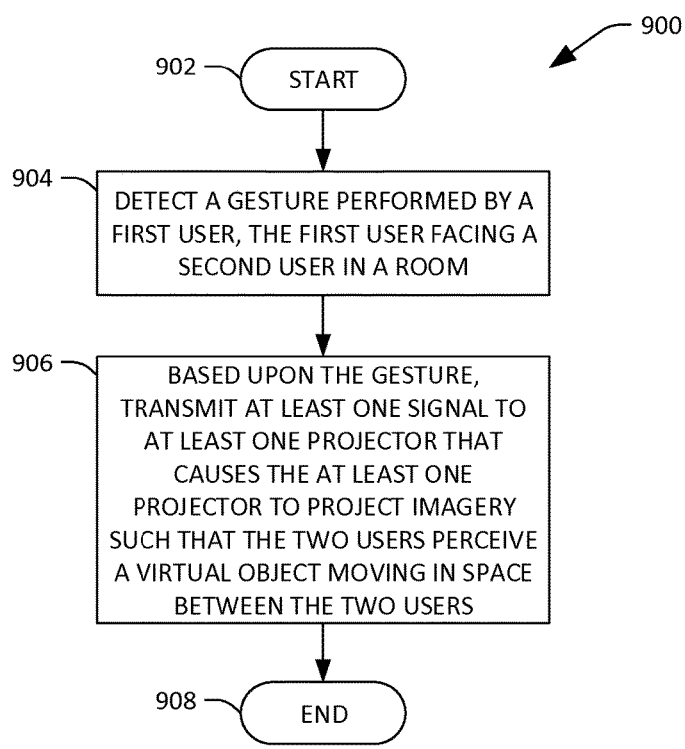
FIG. 9 is a flow diagram that illustrates an exemplary methodology for projecting imagery onto projection surfaces in a room based upon a detected gesture, wherein the imagery causes the two users to perceive a virtual object moving in space between the two users.

With reference now to FIG. 9, an exemplary methodology 900 for projecting imagery in an environment is illustrated. The methodology 900 starts at 902, and at 904, a gesture performed by a first user is detected, where the first user is facing a second user in a room. The gesture can be detected based upon a signal output by a sensor unit, such as a depth image output by depth camera, a color image output by a RGB camera, or the like. At 906, based upon the gesture, at least one signal is transmitted to at least one projector that causes the at least one projector to project imagery onto projection surfaces, where the imagery causes two users to perceive a virtual object moving in space between the two users. For example, the detected gesture may be a throwing motion and the imagery may cause the two users to perceive a ball moving from one user towards the other. In another example, the gesture may be a swipe, and the imagery projected by the projector may cause the two users to perceive a globe spinning in space between the two users. The methodology 900 completes at 908.

Figure 10:
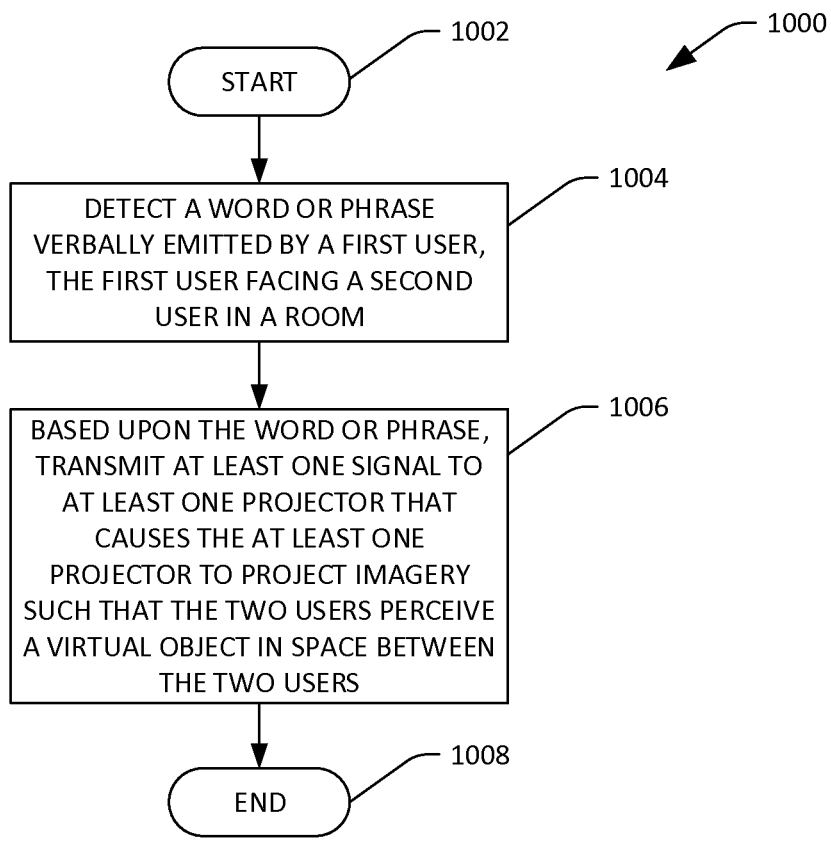
FIG. 10 is a flow diagram illustrating an exemplary methodology for projecting imagery onto projection surfaces in a room based upon a recognized voice command set forth by one of at least two users in the room.

Now referring to FIG. 10, another exemplary methodology 1000 that facilitates projecting imagery in a room that causes two users to perceive a virtual object in space between the two users is illustrated. The methodology 1000 starts at 1002, and at 1004, a word or phrase verbally emitted by a first user is detected, where the first user is facing a second user in a room. For example, a microphone can capture a spoken utterance set forth by the first user, and based upon a signal output by the microphone, at least one word of the utterance can be detected. At 1006, based upon the detected word or phrase, at least one signal is transmitted to at least one projector that causes the at least one projector to project imagery in the room, where the imagery causes the two users to perceive a virtual object in space between the two users. In another example, based upon the detected word or phrase, the at least one signal transmitted to the at least one projector can cause a virtual object to change appearance or location. The methodology 1000 completes at 1008.

Figure 11:
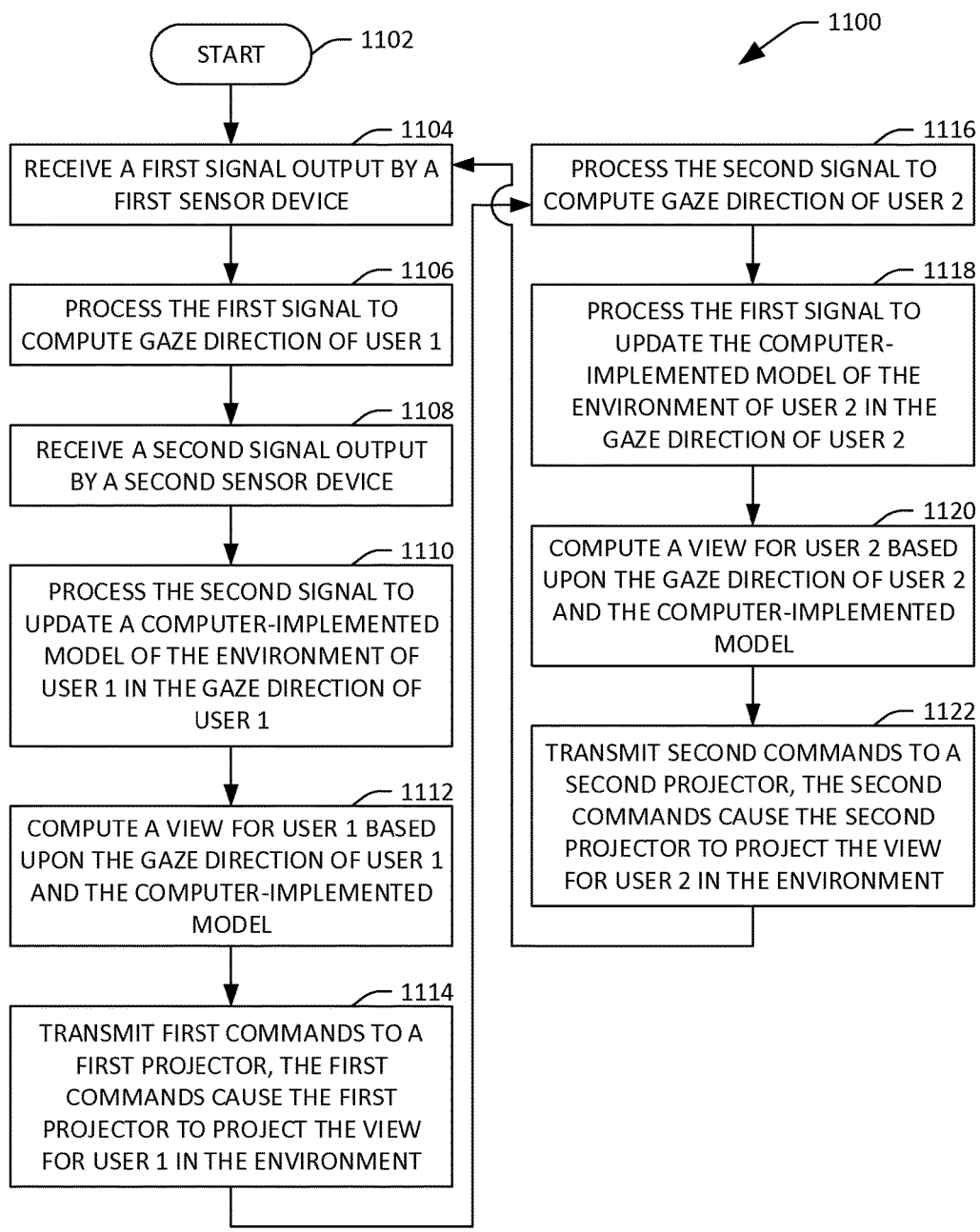
FIG. 11 is a flow diagram illustrating an exemplary methodology for driving at least two projectors in a room, such that imagery projected onto projection surfaces of the room by the two projectors causes two users facing one another to perceive a virtual object in space between the two users.

Now referring to FIG. 11, an exemplary methodology 1100 for simultaneously projecting two views in an environment for two separate users is illustrated, where the views cause the two users to have a SSAR experience. The methodology 1100 starts 1102, and at 1104, a first signal output by a first sensor device is received. The first signal can be, for example, a depth image, a color image or other signal that is indicative of location of a first user in a room. At 1106, the first signal is processed to compute a gaze direction of a first user. For instance, the first signal can be or include a color image and a depth image of the first user in the room, and based upon these images, head tilt and approximate location of the eyes of the first user can be determined, thereby allowing the gaze direction of the first user to be estimated (and field of view of the first user to be estimated).

At 1108, a second signal output by a second sensor unit is received. For example, the second sensor unit can be pointed towards a second user, and like the first sensor signal, the second signal can be or include a depth image, a color image, etc. At 1110, the second signal is processed to update a computer-implemented model of the environment of the first user in the gaze direction of the first user. For example, the second sensor signal can be indicative of location, shape, and movement of a second user in the room, where the second user may act as a projection surface for imagery.

At 1112, a view for the first user is computed based upon the gaze direction of the first user, the computer-implemented model of the environment, and a location in space where a virtual object is to be perceived by the first user. At 1114, first commands are transmitted to a first projector, where the first commands cause the first projector to project the view for the first user in the environment. Accordingly, the first user will perceive the virtual object as being in the appropriate position in space in the environment.

At 1116, the second signal output by the second sensor unit received 1108 is processed to compute a gaze direction of the second user. At 1118, the first signal is processed to update the computer-implemented model of the environment in the gaze direction of the second user. At 1120, a view for the second user in the environment is computed based upon: 1) the gaze direction of the second user; 2) the computer-implemented model of the environment; and 3) the desired position in space that the virtual object is to be perceived by the second user. At 1122, second commands are transmitted to a second projector, where the second commands cause the second projector to project the view for the second user in the environment. The methodology 1100 then returns to 1104. It is to be ascertained that several of the acts are undertaken simultaneously, such that the first user and the second user are provided with a shared experience.

Various examples relating to numerous aspects described herein are now set forth.

Example 1

A computing system comprising: at least one processor; and memory that comprises a plurality of components that are executed by the at least one processor, the plurality of components comprising: a tracker component that is configured to compute a first location of a first user and a second location of a second user in a room, the tracker component computes the first location and the second location based upon at least one signal generated by at least one sensor device; and a render component that is configured to: compute a first view based upon the first location of the first user, the first view to be presented to the first user, the first view comprises a virtual object; compute a second view based upon the second location of the second user, the second view to be presented to the second user, the second view comprises the virtual object; and transmit at least one frame to at least one projector that causes the at least one projector to project imagery onto projection surfaces in the room, the imagery includes at least one of: at least a portion of the first view; or at least a portion of the second view, such that both the first user and the second user perceive the virtual object in space between the first user and the second user.

Example 2

The computing system according to Example 1, the tracker component is further configured to compute a first gaze direction of the first user and a second gaze direction of the second user based upon the at least one signal generated by the sensor device, the render component is further configured to compute the first view based upon the first gaze direction and the second view based upon the second gaze direction.

Example 3

The computing system according to any of Examples 1-2, the memory further comprises a computer-implemented three-dimensional geometric model of the room, the render component is further configured to compute the first view and the second view based upon the computer-implemented three-dimensional geometric model of the room.

Example 4

The computing system according to Example 3, the render component is further configured to update the computer-implemented three-dimensional geometric model in real-time based upon the at least one signal generated by the at least one sensor device.

Example 5

The computing system according to any of Examples 1-4, the at least one frame comprises a first frame and a second frame, the at least one projector comprises a first projector and a second projector, the render component is configured to transmit the frame to the first projector and to transmit the second frame to the second projector, the first frame causes the first projector to project the first view, the second frame causes the second projector to project the second view.

Example 6

The computing system according to Example 5, the at least one frame further comprises a third frame, the at least one projector further comprises a third projector, the render component is configured to transmit the third frame to the third projector, the third frame causes the third projector to project a portion of the first view and a portion of the second view.

Example 7

The computing system according to any of Examples 1-6, the tracker component is configured to detect a gesture performed by the first user relative to the virtual object, and the render component is further configured to compute the first view and the second view based upon the gesture detected by the tracker component.

Example 8

The computing system according to any of Examples 1-7, the tracker component is configured to receive a word spoken by the first user, and the render component is further configured to compute the first view and the second view based upon the word received by the tracker component.

Example 9

The computing system according to any of Examples 1-8, the virtual object being a three-dimensional object.

Example 10

The computing system according to any of Examples 1-9, the at least one signal comprises at least one of a red-green-blue image or a depth image.

Example 11

A method comprising: computing a first gaze direction of a first user in a room based upon at least one sensor signal generated by at least one sensor unit; computing a second gaze direction of a second user in the room based upon the at least one sensor signal generated by the at least one sensor unit; and transmitting at least one frame to at least one projector in the room based upon the first gaze direction of the first user and the second gaze direction of the second user, the at least one frame causes the at least one projector to project imagery on surfaces in the room such that the first user and the second user perceive a virtual object in space between the first user and the second user.

Example 12

The method according to Example 11, further comprising: computing a first view for the first user based upon the first gaze direction of the first user and a computer-implemented geometric model of the room; computing a second view for the second user based upon the second gaze direction of the second user and the computer-implemented geometric model of the room; and generating the at least one frame based upon the first view for the first user and the second view for the second user.

Example 13

The method according to Example 12, further comprising: updating the geometric model in real-time based upon the at least one sensor signal generated by the at least one sensor unit.

Example 14

The method according to Example 13, wherein updating the geometric model in real-time comprises updating the geometric model based upon detected positions of the first user and the second user in the room.

Example 15

The method according to any of Examples 11-14, further comprising: estimating at least one of: reflectivity of a surface in the room based upon the at least one sensor signal generated by the at least one sensor unit; or color properties of the surface in the room based upon the at least one sensor signal generated by the at least one sensor unit; and generating the at least one frame based upon the at least one of the reflectivity of the surface or the color properties of the surface.

Example 16

The method according to any of Examples 11-15, further comprising: detecting a gesture performed by one of the first user or the second user with respect to the virtual object; and generating the frame based upon the gesture.

Example 17

The method according to Example 16, the imagery causes the first user and the second user to perceive that the virtual object is moving in the space between the first user and the second user.

Example 18

The method according to any of Examples 11-17, the at least one frame comprises a first frame and a second frame, and wherein transmitting the at least one frame comprises: transmitting the first frame to a first projector that causes the first projector to project imagery for a first eye of the first user; and transmitting the second frame to a second projector that causes the second projector to project imagery for a second eye of the first user.

Example 19

The method according to any of Examples 11-18, further comprising continuously performing the acts of computing the first gaze direction, computing the second gaze direction, and transmitting the at least one frame to the at least one projector in the room such that the imagery is updated in real-time as a function of alteration of at least one of the first gaze direction or the second gaze direction.

Example 20

A computer-readable storage medium comprising instructions that, when executed by a processor, cause the processor to perform acts comprising: detecting motion of at least one of a first user or a second user in a room, the first user and the second user facing one another in the room; computing a first view for the first user based upon a computer-implemented geometric model of the room and the motion of the at least one of the first user or the second user in the room, the first view comprises a virtual object; computing a second view for the second user based upon the computer-implemented geometric model of the room and the motion of the at least one of the first user or the second user in the room, the second view comprises the virtual object; and transmitting at least one frame to at least one projector, the at least one frame causes the at least one projector to project at least one of: at least a portion of the first view in the room; or at least a portion of the second view in the room, such that the first user and the second user perceive that the virtual object is moving in space between the first user and the second user.

Example 21

A computing system comprising: means for computing a first gaze direction of a first user in a room based upon at least one sensor signal generated by at least one sensor unit; means for computing a second gaze direction of a second user in the room based upon the at least one sensor signal generated by the at least one sensor unit; and means for transmitting at least one frame to at least one projector in the room based upon the first gaze direction of the first user and the second gaze direction of the second user, the at least one frame causes the at least one projector to project imagery on surfaces in the room such that the first user and the second user perceive a virtual object in space between the first user and the second user.

Figure 12:
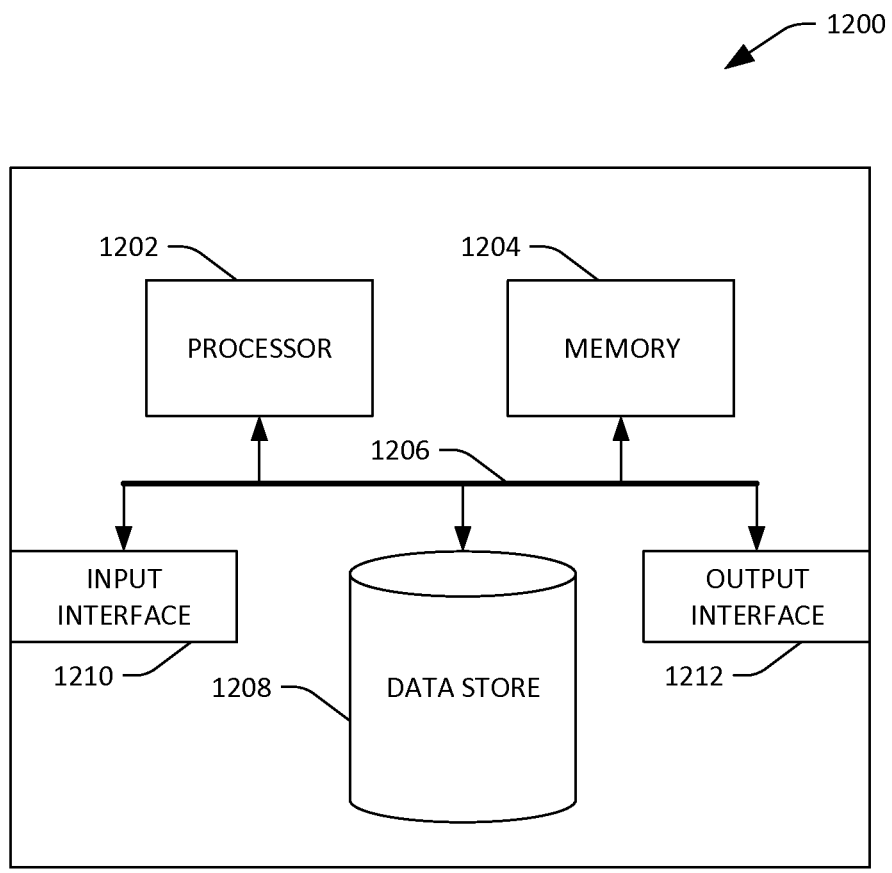
FIG. 12 is an exemplary computing system.

Referring now to FIG. 12, a high-level illustration of an exemplary computing device 1200 that can be used in accordance with the systems and methodologies disclosed herein is illustrated. For instance, the computing device 1200 may be used in a system that is configured to estimate fields of view of users in a room. By way of another example, the computing device 1200 can be used in a system that is configured to generate projection frames that are to be projected by projectors. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store images, depth data, etc.

The computing device 1200 additionally includes a data store 1208 that is accessible by the processor 1202 by way of the system bus 1206. The data store 1208 may include executable instructions, images, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

EXAMPLES

Example 1: Prototype System

A prototype system was constructed, which included three high-definition video projectors, each paired with a depth unit that includes an RGB camera and depth camera. The projectors and sensor units were mounted in positions to both display and sense around two users that are approximately facing each other in a large room. Two of the projector and camera pairs were mounted on the ceiling, about two feet above the heads of each of the two users. These were oriented so that they approximately face one another, covering the opposite walls and part of the floor. Generally, each user's view is rendered by the projector above them. The surface geometry for dynamic projection mapping for a view of a user was provided by sensor units with the projectors above them. Meanwhile, body tracking of that user was supported by the opposite facing sensor unit. This symmetric arrangement of projectors and cameras follows the symmetric nature of dyadic interaction. The third projector and camera pair were mounted on the ceiling, facing downwards, to cover the area between the areas covered by the first two projectors.

A single computing device hosted the software for the system, where the computing device drives all three projectors. All depth data was merged into a single scene using an available three-dimensional game-creation framework, which provided an overview of all sensed geometry and virtual objects in the room, and is usable to script new interactive applications. Furthermore, the framework included various surface shaders, such as lighting, shadows and procedural texturing methods, which help create virtual objects appear more realistic.

Example 2: Calibration and Scene Modeling

Calibration was undertaken to determine the pose, focal length, and optical center of each projector and sensor unit, which were used for dynamic projection mapping. This information was recovered in an offline automatic procedure, whereby each projector in turn displayed a series of Gray code patterns. These patterns were observed by the color camera of the paired sensor unit. Given available coordinate mapping functions corresponding to the sensor unit, this Gray code pattern was used to establish the precise mapping from a three-dimensional point in the sensor unit's coordinate frame to the corresponding point in the projector's image.

The relative pose of each projector-sensor unit pair was established by having color cameras of the sensor units additionally observe the Gray code patterns of all other projectors, noting regions where the other projectors overlap with the camera's own paired projector, and computing the transform that brings corresponding 3D points of overlapping regions into alignment. This process resulted in a world coordinate system for all projectors and cameras.

The surface geometry of the physical environment was obtained through use of time-of-flight depth cameras in the sensor units. The precision of depth data for the depth camera was approximately constant over the range of depth (0.5 m-4.5 m). The surface geometry of the physical environment was used for dynamic projection mapping.

Moving objects in the environment, such users' bodies, were handled separately from the static geometry of the room. This was undertaken primarily for two reasons: 1) first, the system may project onto regions of the room that are otherwise occluded by moving objects; 2), static geometries support various offline analysis and optimization procedures that are difficult to perform on dynamic geometry.

Example 3: Dynamic Projection Mapping

Given the parameters of all projectors and depth cameras, as well as the geometry of the room, graphics can be rendered that change the surface appearance of physical objects in the room. This can be implemented as a single vertex shader which employs the mapping from 3D world coordinate point to the 2D point in a projector's image, as computed from calibration.

Rendering a virtual 3D object so that it appears correct from a given user's viewpoint is more complex and was implemented as a multi-pass rendering process, whereby the virtual objects and real physical geometry were rendered offscreen from the desired viewpoint. This offscreen rendering was then combined with the surface geometry and projector parameters in a standard projective texturing procedure, where only the physical geometry was rendered. The user's viewpoint was set to follow the head position determined by body tracking.

Example 4: Supporting Multiple Views

The placement of the two opposite facing projectors was chosen so that each projector primarily displays the view corresponding to the user standing under it. A virtual object placed several feet above the ground and between the users, for example, would be rendered twice, once for each user. Because the users were looking in opposite directions, one user was unlikely to see the graphics intended for the other user, because it appeared on the wall behind them, or on their own bodies.

When the virtual object was placed nearer the ground between the users, the view of the object intended for one user was seen by the other. In the prototype, the view of each user was modeled as a standard perspective graphics camera. Where the physical surfaces addressed by each view overlapped, the renderings were blended so that both are ultimately visible. For example, two views of the same object appeared on the floor. In the case when the object is placed on the ground, the two renderings of the object overlapped and met at the ground.

Example 5: Interactions

In addition to seeing virtual 3D objects rendered correctly, users interacted with them in various ways. A number of interactions supported by body tracking technologies and lower-level features derived from depth and infrared images were explored. For example, "touching" a virtual object was implemented by intersecting either the tracked hand position or points taken from the user's depth map, with the geometry of the virtual object.

An interactive application was developed that allowed a user to hold a virtual object in her hand. The virtual object was scripted to follow a point just above the hand as it is tracked in 3D by the sensor unit. The multi-view rendering described above rendered the object once for each user's view. As the user held her hand up in front of her body, her view included a large projection at the far surface of the room, spanning the other user's body. Meanwhile, the second user's view included a small projection of the object, over the first user's torso.

In the interactive application, held objects could be dropped or thrown by meeting some conditions for release. For example, a held ball was thrown when the detected velocity and/or acceleration of the hand exceeded a threshold. At the moment of release, the ball took the velocity of throwing hand. Catching or "picking up" was implemented by testing when an object was sufficiently close to the tracked hand.

Another interactive application was developed that detected the collision of virtual objects with the room or the user, leading to a realistic collision response. The prototype used pre-computed collision geometries for the static parts of the room, and approximated the shape of moving objects such as the user with a number of sphere colliders. While with the rendering pipeline of the prototype texture was applied to a static part of the room, application of a texture to a moving object such as the user required real-time tracking of the projection surface. Low-level motion features, such as optical flow, were used to apply texture to moving objects. Real-time optical flow was computed from infrared video output by depth cameras of the sensor units. A texture was applied to moving objects by determining an initial placement of the texture and then following the surface over many frames using the motion estimated by optical flow.

Example 6: Rendering Virtual Objects

As an initial demonstration of dynamic projection mapping, a number of static models were placed above a coffee table in the middle of a room. These static models included an airplane, a racecar, and a globe. While both users acquired a good sense of the airplane, the globe was more challenging because each user views different sides of the globe. An ability to spin the globe by "touching" or intersecting with the globe was coded.

Example 7: Fireball Game

To test the ability to hold a virtual object and throw it accurately, a combat-style game was created, where players summon a fireball by raising their hand. The fireball appeared to hover over the hand a few inches. The player could quickly throw the fireball at the opposing player. If it hits the wall, damage was temporarily rendered at the point of collision. If it strikes the user, a texture was applied to the user indicating injury. This visual effect tracked the projection surface on the player using optical flow as described above, and the attacking player scored a point. Release of the fireball was triggered by exceeding a threshold on the velocity of the hand holding the fireball. The direction was determined by computing the ray from the tracked head position through the hand. With a little practice, players were able to accurately direct the fireball.

Example 8: Catch

The prototype was coded to allow two users to play catch with a virtual tennis ball. This experience extended the previous example by adding a means to catch the ball: if the ball was sufficiently close to the hand, it was considered "caught" and was placed in the hand. The player may then throw it back to the other player. If the player was unable to catch the ball, it collided with the user or other objects in the room. In this case the ball bounced and rolled in a physically plausible way. The ability of the players to catch the ball hinged directly on their ability to perceive the virtual object in space.

Experimental Data

To evaluate the effectiveness of the dyadic projected SAR system, two user experiments were conducted that focused on following: 1) whether users correctly perceive virtual objects; and 2) where the users understand their collaborators' interactions with virtual objects. The experiments indicate that users perceive the desired SSAR effect.

The first experiment focused on examining the effectiveness of a single-user monoscopic perspective view to convey the sense of the virtual object's spatial presence. In particular, the first experiment analyzed whether the participants could perceive projected virtual objects as spatial rather than appearing only at the projection surface. Additionally, factors that affect their perfection were analyzed. The second experiment quantified how well two collaborators understood each other's pointing references when discussing virtual objects between them in a face-to-face scenario.

Experiment 1: Object Presence

As a measure of the virtual object presence, participants were asked to rate the distance to and size of projected virtual objects. The projected test object was a green cube of three different sizes (small=10 cm, medium=15 cm, and large=20 cm edge) and virtually positioned at three different distances from the participant (near=1.5 m, middle=2.5 m, and far=3.5 m). From the participant's point of view, the image of the virtual object was always projected on the back wall of the room (approximately 3.75 m away from the user).

It is to be noted that the object's sizes were (intentionally) highly confusable across the tested distances. In fact, when projected at the nearest location, the smallest object subtended roughly the same visual angle as the largest object at the farthest distance.

In addition to varying size and distance, two different conditions for performing this task were introduced: with and without physical markers. The "with markers" condition included three black poles placed exactly at the location where the virtual object could appear, while the "no markers" condition had those poles removed. If observed correctly, the virtual object would appear to sit on the physical marker. The goal was not to tell the participant where the object was with the physical marker, but rather to aid them by giving them a real-world physical anchor that they could compare to the virtual object. The participants were still required to determine which of the three markers the virtual object was attached to. In addition to the hypothesis that the participants were able to correctly understand the spatial placement of projected virtual objects (H1), it was hypothesized that having a physical object marking the possible location of the virtual object would make the rating task simpler (H2). This was motivated by observations that virtual objects projected in the collaborator's hand always seemed a bit more spatial and real, than the objects purely placed in mid-air. The physical markers in the experiment served as a controlled proxy for the user's hand.

Lastly, it was hypothesized that participants would be more accurate in rating objects closer to the projection surface (H3), e.g., further away from the participant, since the real-world and the virtual object's location are in closer agreement in such cases. This is contrary to the real-world behavior, where humans are better in rating closer objects as objects further away form a smaller visual angle and are therefore harder to see.

Each participant was first given a brief introduction to the system, and then asked to stand facing the side of the room where their perspective projected view would be shown. In front of them was a short coffee table on top of which three physical models of the three cubes were placed. Those physical cubes precisely matched the scale of projected virtual cubes. The three possible locations where the virtual object would appear were marked on the floor with a number (1—near, 2—mid, 3—far).

The participants were asked to verbally rate each object's size (indicating "small", "medium", or "large") and distance (indicating "1", "2", or "3", corresponding to the marked floor location). A coordinator recorded their ratings and advanced to the next trial. To ensure the same amount of stimulus across all participants, the object was projected for exactly 5 seconds, after which it disappeared. The participants were instructed to give their ratings as soon as they felt confident, and their response time was recorded as the time from the object's appearance to the time of coordinator's entry. For evaluation simplicity, the trials were grouped by condition since setup of physical markers required time and would render collection of large dataset difficult. The presentation of size and distance trials was randomized within each condition block, and the order of conditions was counterbalanced across users to reduce the effects of ordering. Before each condition, the participants were given a practice session where they were shown each object at each size and distance combination (without the 5 second limit) and the study coordinators gave them feedback on their ratings.

The participants were initially positioned such that the objects appeared at the same physical location on the back wall. They were explicitly told that they could move around if that helped them make a decision, but were asked to remain roughly within a step away from the initial position marked on the floor. While the projection was monoscopic, participants could use other depth cues including shading, perspective, shadows, size, and motion parallax.

Overall, participants were more accurate in rating Distance (88.8%) than Size of virtual objects (70.7%). When considering both Distance and Size, they provided a correct rating in 66.5% of trials, which is significantly better than chance (1 out of 9 combinations). These findings support the H1 hypothesis that users can and do perceive virtual objects as having spatial presence in a perspective SAR scenario.

Out of 792 total trials, only 9 ratings were more than one option away from the ground truth in either size or distance (e.g., mistaking a "small" size for "large") and those could be considered outliers. Given only three possible options in each category, this is not surprising, but this effectively means that the participants were either right on target ("correct") or one target off ("incorrect").

The participant's responses were coded into a binary variable ("correct" or "incorrect") for each of the size, distance, as well as size and distance combined rating. Given such binary responses, standard linear regression models or analysis of variance (ANOVA) are not appropriate since they assume scalar responses drawn from a normal distribution. The appropriate method of statistical analysis for correctness of user's ratings is "repeated measures logistic regression." In this case, logistic regression computed the correlation between the varied factors (e.g., different sizes, distances, or conditions) and a binary outcome ("correct" or "incorrect"). The significance metric for logistic regression is Wald Chi-Square ($\chi^2$).

The analysis was run on the model comprising the following factors: Condition, Size, and Distance. When analyzing the overall correctness (e.g., correct for both size and distance), significant effects for Distance were found ($\chi^2=11.746$, df=2, p=0.003; a p-value<=0.05 shows a statistically significant effect), but not for Size or Condition. Distance had a strong effect on the ratings with "far" distance (3.5 m away) being significantly more accurate than "near" and "mid". This result runs contrary to the real-world behavior where closer objects tend to be easier to rate, but it confirms the H3 hypothesis, that being closer to the projection surface makes it easier for the user to correctly perceive the spatial characteristics of the projected 3D virtual object. In the experiment, the "far" distance was only 25 cm away from the back wall where the object was being projected.

While participants were more correct in the condition with physical markers (67.4%) versus no markers (65.6%), Condition was not found to have a statistically significant effect. This result failed to confirm the hypothesis H2. The results were further analyzed to understand why hypothesis H2 failed to hold. Presence of markers improved participants' ratings on average 6% when objects were far away from the projection surface (at "near" and "mid" distances), but actually hurt their performance in the "far" distance. This might be explained by the fact that at the "far" location, participants already had a large physical reference, the projection wall itself, to help them judge distance and were potentially just distracted by the presence of multiple poles in front of the projected object. Thus, when the virtual object was further away from the projection surface, the presence of physical markers may have been beneficial.

Furthermore, interaction of Size*Distance had a highly significant effect ($\chi^2=47.482$, df=4, p<0.001). This was not surprising, since some of the combinations were easily identifiable (e.g., the small cube at the far distance was the smallest projected object) while some were highly confusable (e.g., the medium cube at the near position is easily confused with the large cube at mid position).

Response time included the time for the coordinator to log the result and advance the trial (approximately 1 second). The average response time was 6.47 s (std. dev.=2.27 s). Repeated measures ANOVA were performed on the response time and found that it closely correlates with the rating analysis: participants were significantly faster in responding to conditions where they were also found to be more accurate. This indicates that the results do not fall under a speed-accuracy tradeoff common to many targeting experiments.

Experiment 2: Understanding Collaborator's Spatial References in a Dyad

A task was designed in which a participant observed their partner raise a short pole to their eye level and point at one of 16 spheres that appeared between the participant and the coordinator. Participants verbally indicated which sphere they believed their partner was pointing at. The spheres were arranged in a 4×4 grid and were clearly numbered. In this configuration, the spheres in the grid were projected partially on the human bodies in space and partially on the walls behind them.

Each sphere in the grid was 10 cm in diameter and the spheres were 11 cm apart (center to center). The grid floated 1.5 meters above the floor. This particular arrangement of targets was found in the first experiment (referenced above) to be dense enough to be potentially confusable while offering enough spatial resolution to mimic the requirements in many real world face-to-face tasks (e.g., two people discussing an architectural model between them). While targeting with a rifle-like aiming gesture is not a natural pointing style, this pose was chosen to avoid the ambiguity of individual person's pointing style.

Rather than comparing targeting performance among multiple conditions, this experiment was designed to quantify the overall accuracy of a participant's understanding of their partner's references. According, the error (in meters) in their estimate was measured as the distance from the sphere they indicated to the actual targeted sphere.

The same group of participants from the first experiment participated in this experiment. Each participant stood at the same location as in the first experiment. Their collaborator stood on the other side of the room (approximately 2.5 m away). At the start of the experiment, the collaborator was silently prompted by the system to point at a specific numbered ball in the grid. The participant then verbally indicated which sphere they believe their collaborator was pointing at. The trial was not time limited, but participants were instructed to respond as soon as they felt confident in their rating. One of the study coordinators entered their response to conclude the trial. The collaborator returned to a neutral pose (non-targeting) between each trial. Before running the experiment, each participant was given a set of 15 practice trials during which they were given feedback on their performance. The order of presentation of target spheres was randomized, and each participant gave two ratings for each sphere condition for a total of 32 ratings.

Participants identified the correct target in 54.5% of 352 total trials. This is significantly higher than chance (1 out of 16) and is impressive when one considers the distance between the selected target and the true target. Averaged over all trials this spatial error was 0.056 m (std. dev.=0.063 m). This low value indicates that when participants selected the incorrect target, they overwhelmingly indicated one of the nearest neighbor targets (the targets themselves were 0.11 m away). Errors were not uniformly distributed. For example, the lower right target exhibited more than twice the error compared to targets in the upper right corner.

The angular difference in targeting two adjacent target spheres was approximately 4.5°. That participants could tell the target reference to within a 12 cm radius is impressive and provides evidence that the prototype system is capable of presenting virtual information between the two unencumbered users in a way that enables mutual spatial understanding.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system comprising:
   at least one processor; and
   memory that stores instructions that, when executed by the at least one processor, cause the at least one processor to perform acts comprising:
      computing a first location of a first user and a second location of a second user in a room, the first location and the second location computed based upon at least one signal generated by at least one sensor device;
      computing a first view of a virtual object based upon the first location of the first user, the first view of the virtual object to be presented to the first user, the first view of the virtual object is to be projected onto the second user for viewing by the first user;
      computing a second view of the virtual object based upon the second location of the second user, the second view of the virtual object is different from the first view of the virtual object, the second view of the virtual object is to be projected onto the first user for viewing by the second user; and
      transmitting at least one frame to at least one projector that causes the at least one projector to simultaneously project the first view of the virtual object onto the second user in the room and the second view of the virtual object onto the first user in the room, wherein the virtual object appears in space, to the first user and the second user, between the first user and the second user due to the first view of the virtual object and the second view of the virtual object being simultaneously projected onto the second user and the first user, respectively.

2. The computing system of claim 1, the acts further comprising computing a first gaze direction of the first user and a second gaze direction of the second user based upon the at least one signal generated by the sensor device, wherein the first view of the virtual object is computed based upon the first gaze direction and the second view of the virtual object is computed based upon the second gaze direction.

3. The computing system of claim 1, the memory further comprises a computer-implemented three-dimensional geometric model of the room, the first view of the virtual object and the second view of the virtual object computed based upon the computer-implemented three-dimensional geometric model of the room.

4. The computing system of claim 3, the acts further comprising updating the computer-implemented three-dimensional geometric model in real-time based upon the at least one signal generated by the at least one sensor device.

5. The computing system of claim 1, the at least one frame comprises a first frame and a second frame, the at least one projector comprises a first projector and a second projector, the acts further comprising:
   transmitting the first frame to the first projector; and
   transmitting the second frame to the second projector, the first frame causes the first projector to project the first view of the virtual object, the second frame causes the second projector to project the second view of the virtual object.

6. The computing system of claim 5, the at least one frame further comprises a third frame, the at least one projector further comprises a third projector, the acts further comprising transmitting the third frame to the third projector, the third frame causes the third projector to project a portion of the first view of the virtual object and a portion of the second view of the virtual object.

7. The computing system of claim 1, the acts further comprising:
   detecting a gesture performed by the first user relative to the virtual object; and
   computing the first view of the virtual object and the second view of the virtual object based upon the detected gesture.

8. The computing system of claim 1, the acts further comprising:
   receiving a word spoken by the first user; and
   computing the first view of the virtual object and the second view of the virtual object based upon the received word.

9. The computing system of claim 1, the virtual object being a three-dimensional object.

10. The computing system of claim 1, the at least one signal comprises at least one of a red-green-blue image or a depth image.

11. A method comprising:
   computing a first gaze direction of a first user in a room based upon at least one sensor signal generated by at least one sensor unit;
   computing a second gaze direction of a second user in the room based upon the at least one sensor signal generated by the at least one sensor unit;
   computing a first view of a virtual object for viewing by the first user based upon the first gaze direction of the first user and a computer-implemented geometric model of the room;

computing a second view of the virtual object for the second user based upon the second gaze direction of the second user and the computer-implemented geometric model of the room, wherein the first view of the virtual object and the second view of the virtual object are different; and transmitting at least one frame to at least one projector in the room based upon the first view of the virtual object for the first user and the second view of the virtual object for the second user, the at least one frame causes the at least one projector to project the first view of the virtual object onto the second user in the room such that the first view of the virtual object is presented to the first user and to project the second view of the virtual object onto the first user in the room such that the second view of the virtual object is presented to the second user, and further wherein simultaneous presentment of first view of the virtual object to the first user and the second view of the virtual object to the second user causes the virtual object to appear in space, to the first user and the second user, between the first user and the second user.

12. The method of claim 11, further comprising:
updating the geometric model in real-time based upon the at least one sensor signal generated by the at least one sensor unit.

13. The method of claim 12, wherein updating the geometric model in real-time comprises updating the geometric model based upon detected positions of the first user and the second user in the room.

14. The method of claim 11, further comprising:
estimating at least one of:
reflectivity of a surface in the room based upon the at least one sensor signal generated by the at least one sensor unit; or
color properties of the surface in the room based upon the at least one sensor signal generated by the at least one sensor unit; and
generating the at least one frame based upon the at least one of the reflectivity of the surface or the color properties of the surface.

15. The method of claim 11, further comprising:
detecting a gesture performed by one of the first user or the second user with respect to the virtual object; and
generating the at least one frame based upon the gesture.

16. The method of claim 15, wherein simultaneous presentment of the first view of the virtual object to the first user and the second view of the virtual object to the second user causes the first user and the second user to perceive that the virtual object is moving in the space between the first user and the second user.

17. The method of claim 11, the at least one frame comprises a first frame and a second frame, and wherein transmitting the at least one frame comprises:
transmitting the first frame to a first projector that causes the first projector to project the first view of the virtual object for the first user; and transmitting the second frame to a second projector that causes the second projector to project the second view of the virtual object for the second user.

18. The method of claim 11, further comprising continuously performing the acts of computing the first gaze direction, computing the second gaze direction, computing the first view of the virtual object, computing the second view of the virtual object, and transmitting the at least one frame to the at least one projector in the room such that at least one of the first view of the virtual object or the second view of the virtual object is updated in real-time as a function of alteration of at least one of the first gaze direction or the second gaze direction.

19. A computing system comprising:
a processor; and
memory storing instructions that, when executed by a processor, cause the processor to perform acts comprising:
detecting motion of at least one of a first user or a second user in a room, the first user and the second user facing one another in the room;
updating a computer-implemented geometric model of the room based upon the detected motion of the at least one of the first user or the second user in the room;
responsive to updating the computer-implemented geometric model of the room, computing a first view of a virtual object for presentment to the first user, the first view of the virtual object computed based upon the computer-implemented geometric model of the room;
responsive to updating the computer-implemented geometric model of the room, computing a second view of the virtual object for presentment to the second user, the second view of the virtual object computed based upon the computer-implemented geometric model of the room; and
transmitting at least one frame to at least one projector, the at least one frame causes the at least one projector to simultaneously project a portion of the first view of the virtual object in the room on the second user and at least a portion of the second view of the virtual object in the room on the first user, wherein the virtual object appears, to the first user and the second user, to be moving in space between the first user and the second user.

20. The computing system of claim 1, wherein the first view of the virtual object and the second view of the virtual object are computed in real-time based upon a computer-implemented geometry of the room being updated, and further wherein the computer-implemented geometry of the room is updated in real-time as the first user and the second user move about in the room.

* * * * *